US010656672B2

(12) United States Patent
Youn et al.

(10) Patent No.: US 10,656,672 B2
(45) Date of Patent: May 19, 2020

(54) DISPLAY DEVICE

(71) Applicant: LG ELECTRONICS INC., Seoul (KR)

(72) Inventors: Hyunseung Youn, Seoul (KR); Sungeun Yang, Seoul (KR); Seokhee Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/133,047

(22) Filed: Sep. 17, 2018

(65) Prior Publication Data
US 2019/0227591 A1 Jul. 25, 2019

(30) Foreign Application Priority Data

Jan. 25, 2018 (KR) .................. 10-2018-0009573

(51) Int. Cl.
H04R 1/02 (2006.01)
G06F 1/16 (2006.01)
H04R 1/26 (2006.01)

(52) U.S. Cl.
CPC .......... G06F 1/1605 (2013.01); G06F 1/1688 (2013.01); H04R 1/025 (2013.01); H04R 1/26 (2013.01); H04R 2499/15 (2013.01)

(58) Field of Classification Search
CPC . H04R 9/06; H04R 1/02; H04R 1/025; H04R 1/026; H04R 9/00; H04R 7/00; H04R 2207/00

USPC ................. 381/333, 388, 396, 429
See application file for complete search history.

(56) References Cited

U.S. PATENT DOCUMENTS 4,158,756 A * 6/1979 Keezer ...................... H04R 7/12
29/594
4,926,487 A * 5/1990 Yoshida .................. H04N 5/642
348/E5.13
8,447,052 B2 * 5/2013 Lee ........................... H04R 1/00
381/152

FOREIGN PATENT DOCUMENTS

KR 10-2012-0081791 A 7/2012
KR 10-2013-0116581 A 10/2013
KR 10-1570538 B1 11/2015
KR 10-2016-0143471 A 12/2016
KR 10-2017-0069530 A 6/2017

* cited by examiner

Primary Examiner — Suhan Ni
(74) Attorney, Agent, or Firm — Birch, Stewart, Kolasch & Birch, LLP

(57) ABSTRACT

A display device is disclosed. An object of the present disclosure is to match reproduction frequency bands of sounds output from a plurality of speakers. Another object of the present disclosure is to match magnitudes of sounds output from a plurality of speakers.
According to at least one aspect of the present disclosure, the present disclosure can match reproduction frequency bands of sounds output from a plurality of speakers. According to at least one aspect of the present disclosure, the present disclosure can match magnitudes of sounds output from a plurality of speakers.

12 Claims, 40 Drawing Sheets

DISPLAY DEVICE

CROSS-REFERENCE TO RELATED APPLICATION

Pursuant to 35 U.S.C. § 119(a), this application claims the benefit of an earlier filing date and priority to Korean Application No. 10-2018-0009573 filed in the Republic of Korea on Jan. 25, 2018, the contents of which are incorporated by reference herein in its entirety.

BACKGROUND OF THE INVENTION

Field of the Invention

The present disclosure relates to a display device.

Discussion of the Related Art

With the development of the information society, various demands for display devices are increasing. Various display devices, such as liquid crystal displays (LCDs), plasma display panels (PDPs), electroluminescent displays (ELDs), and vacuum fluorescent displays (VFDs), have been recently studied and used in response to various demands for the display devices.

An organic light emitting diode (OLED) panel can display an image by depositing an organic layer, that is able to emit light by itself, on a substrate on which transparent electrodes are formed. The OLED panel has a thin profile and flexible characteristics. Many studies have been conducted on structural characteristics of a display device including the OLED panel.

There is a recent tendency that a sound system or an image control system, that may be included in a display device, is separated from a display panel, and accordingly studies thereof have been actively carried out.

SUMMARY OF THE INVENTION

An object of the present disclosure is to address the above-described and other problems. Another object of the present disclosure is to secure rigidity of a slim display device.

Another object of the present disclosure is to secure an installation balance of a display device.

Another object of the present disclosure is to efficiently cool heat generated in stacked electronic parts.

Another object of the present disclosure is to match reproduction frequency bands of sounds output from a plurality of speakers.

Another object of the present disclosure is to match magnitudes of sounds output from a plurality of speakers.

In one aspect of the present disclosure, there is provided a display device comprising a display panel, a first speaker unit including a first space and a second space isolated from the first space and communicating with an outside, the first speaker unit including a first opening communicating the first space with the second space and a second opening spaced from the first opening and communicating the first space with the second space, the first speaker unit being spaced from the display panel, a first speaker installed in the first opening and providing a sound to the second space, a first diaphragm installed in the second opening, a second speaker unit including a third space and a fourth space isolated from the third space and communicating with the outside, the second speaker unit including a third opening communicating the third space with the fourth space and a fourth opening spaced from the third opening and communicating the third space with the fourth space, the second speaker unit being spaced from the display panel, a second speaker installed in the third opening and providing a sound to the fourth space, and a second diaphragm installed in the fourth opening and having an area different from an area of the first diaphragm.

The first space may be larger than the third space.

The area of the first diaphragm may be larger than the area of the second diaphragm.

The first speaker unit may include a fifth opening communicating the second space with the outside, and the first speaker may be positioned closer to the fifth opening than the first diaphragm.

The second speaker unit may include a sixth opening communicating the fourth space with the outside, and the second speaker may be positioned closer to the sixth opening than the second diaphragm.

The first opening may be larger than the fifth opening.

The first speaker unit may include a fifth opening communicating the second space with the outside. The display panel may include a front surface displaying an image. The fifth opening may be positioned forward.

The display device may further comprise a plate positioned in a rear of the display panel, the plate including a first part to which the display panel is fixed, and a second part extended from a lower end of the first part and bent toward a front of the first part, and a housing positioned in a rear of the second part and coupled to the second part. The first speaker unit and the second speaker unit may be installed inside the housing.

The first part may be integrally formed with the second part and may include a light transmitting material.

The first opening may face upward.

The second opening may face upward.

The first diaphragm may have a quadrilateral shape.

The display device may further comprise a cover coupled to an upper side of the first speaker unit. The cover may be opposite to the first speaker and the first diaphragm.

Effects of a control unit and a display device including the control unit according to the present disclosure are described as follows.

According to at least one aspect of the present disclosure, the present disclosure can secure rigidity of a slim display device.

According to at least one aspect of the present disclosure, the present disclosure can efficiently cool heat generated in stacked electronic parts.

According to at least one aspect of the present disclosure, the present disclosure can match reproduction frequency bands of sounds output from a plurality of speakers.

According to at least one aspect of the present disclosure, the present disclosure can match magnitudes of sounds output from a plurality of speakers.

Further scope of applicability of the present disclosure will become apparent from the detailed description given hereinafter. However, it should be understood that the detailed description and specific examples, while indicating preferred embodiments of the disclosure, are given by illustration only, since various changes and modifications within the spirit and scope of the disclosure will become apparent to those skilled in the art from this detailed description.

BRIEF DESCRIPTION OF THE DRAWINGS

The accompanying drawings, that may be included to provide a further understanding of the disclosure and are incorporated in and constitute a part of this specification, illustrate embodiments of the disclosure and together with the description serve to explain various principles of the disclosure.

DETAILED DESCRIPTION OF THE EMBODIMENTS

Figure 1:
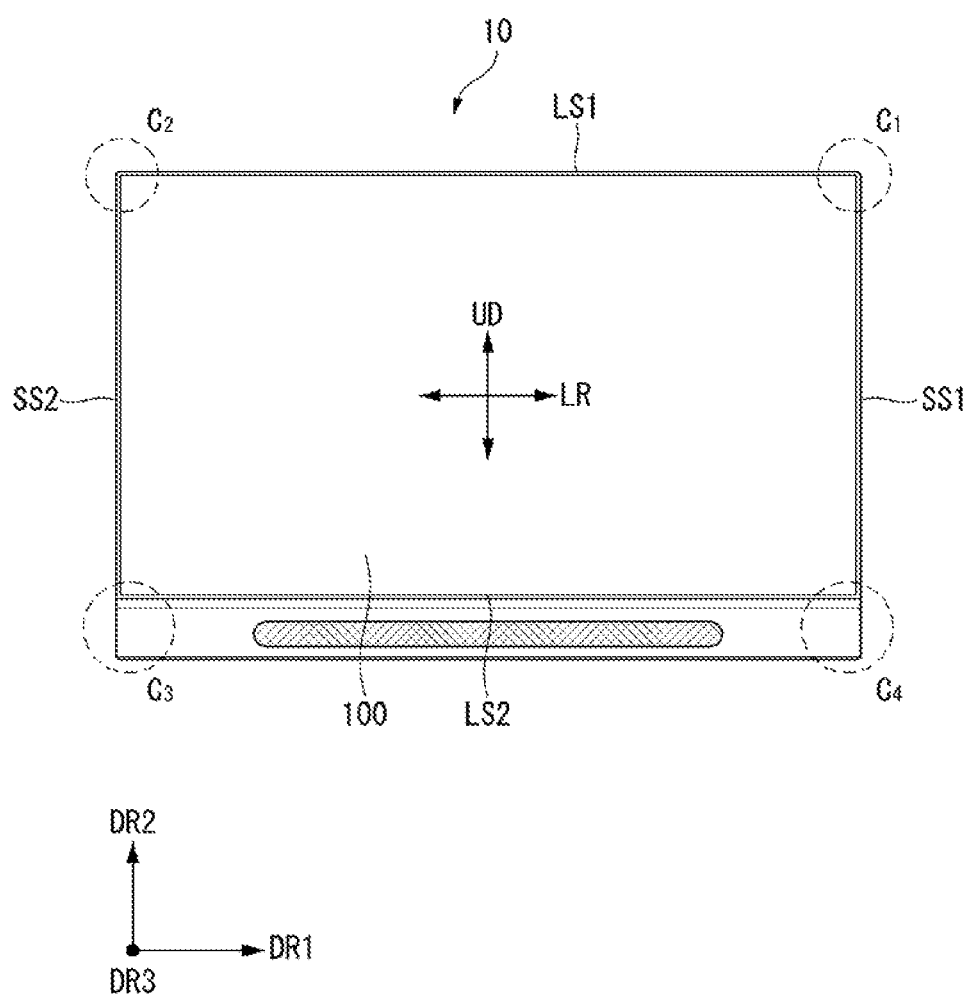
FIG. 1 illustrates an example of a display device according to an embodiment of the disclosure.

Reference will now be made in detail embodiments of the disclosure examples of which are illustrated in the accompanying drawings. Since the present disclosure may be modified in various ways and may have various forms, specific embodiments are illustrated in the drawings and are described in detail in the present specification. However, it should be understood that the present disclosure are not limited to specific disclosed embodiments, but include all modifications, equivalents and substitutes included within the spirit and technical scope of the present disclosure.

The terms 'first', 'second', etc. may be used to describe various components, but the components are not limited by such terms. The terms are used only for the purpose of distinguishing one component from other components. For example, a first component may be designated as a second component without departing from the scope of the present disclosure. In the same manner, the second component may be designated as the first component.

The term "and/or" encompasses both combinations of the plurality of related items disclosed and any item from among the plurality of related items disclosed.

When an arbitrary component is described as "being connected to" or "being linked to" another component, this should be understood to mean that still another component(s) may exist between them, although the arbitrary component may be directly connected to, or linked to, the second component. In contrast, when an arbitrary component is described as "being directly connected to" or "being directly linked to" another component, this should be understood to mean that no component exists between them.

The terms used in the present application are used to describe only specific embodiments or examples, and are not intended to limit the present disclosure. A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary knowledge in the art to which the present disclosure pertains. The terms defined in a generally used dictionary must be understood to have meanings identical to those used in the context of a related art, and are not to be construed to have ideal or excessively formal meanings unless they are obviously specified in the present application.

The following embodiments of the present disclosure are provided to those skilled in the art in order to describe the present disclosure more completely. Accordingly, shapes and sizes of elements shown in the drawings may be exaggerated for clarity.

Hereinafter, embodiments of the disclosure will be described using an organic light emitting diode (OLED) panel as an example of a display panel. However, embodiments are not limited thereto. For example, a plasma display panel (PDP), a field emission display (FED) panel, and a liquid crystal display (LCD) panel may be used.

Referring to FIG. 1, a display panel 100 or a head 10 may include a first long side LS1, a second long side LS2 opposite the first long side LS1, a first short side SS1 adjacent to the first long side LS1 and the second long side LS2, and a second short side SS2 opposite the first short side SS1.

In embodiments disclosed herein, the first short side SS1 may be referred to as a first side area; the second short side SS2 may be referred to as a second side area opposite the first side area; the first long side LS1 may be referred to as a third side area which is adjacent to the first side area and the second side area and is positioned between the first side area and the second side area; and the second long side LS2 may be referred to as a fourth side area which is adjacent to the first side area and the second side area, is positioned between the first side area and the second side area, and is opposite to the third side area.

Embodiments of the disclosure describe that lengths of the first and second long sides LS1 and LS2 are longer than lengths of the first and second short sides SS1 and SS2 for convenience of explanation. However, the lengths of the first and second long sides LS1 and LS2 may be almost equal to the lengths of the first and second short sides SS1 and SS2.

In the following description, a first direction DR1 may be a direction parallel to the long sides LS1 and LS2 of the display panel 100, and a second direction DR2 may be a direction parallel to the short sides SS1 and SS2 of the display panel 100. Further, a third direction DR3 may be a direction vertical to the first direction DR1 and/or the second direction DR2.

In embodiments disclosed herein, a side or a surface, on which the head 10 of a display device displays an image, may be referred to as a forward direction, a front side, or a front surface. When the head 10 of the display device displays an image, a side or a surface, at which the image cannot be viewed, may be referred to as a backward or rearward direction, a back or rear side, or a back or rear surface. When the head 10 of the display device is observed at the forward direction, the front side, or the front surface, the first long side LS1 may be referred to as an upward direction, an upper side, or an upper surface. In the same manner as the first long side LS1, the second long side LS2 may be referred to as a downward direction, a lower side, or a lower surface. Further, the first short side SS1 may be referred to as a right direction, a right side, or a right surface, and the second short side SS2 may be referred to as a left direction, a left side, or a left surface.

Further, the first long side LS1, the second long side LS2, the first short side SS1, and the second short side SS2 may be referred to as edges of the head 10 of the display device. Positions where the first long side LS1, the second long side LS2, the first short side SS1, and the second short side SS2 meet one another may be referred to as corners. For example, a position where the first long side LS1 and the first short side SS1 meet each other may be referred to as a first corner C1; a position where the first long side LS1 and the second short side SS2 meet each other may be referred to as a second corner C2; a position where the second short side SS2 and the second long side LS2 meet each other may be referred to as a third corner C3; and a position where the second long side LS2 and the first short side SS1 meet each other may be referred to as a fourth corner C4.

In embodiments disclosed herein, a direction from the first short side SS1 to the second short side SS2 or a direction from the second short side SS2 to the first short side SS1 may be referred to as a left-right direction LR. A direction from the first long side LS1 to the second long side LS2 or a direction from the second long side LS2 to the first long side LS1 may be referred to as an up-down direction UD.

Figure 2:
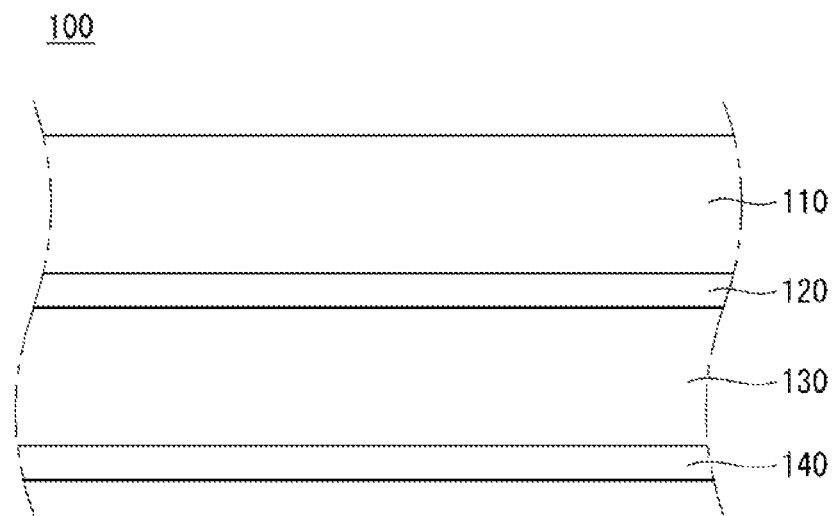
FIG. 2 illustrates an example of a display panel according to an embodiment of the disclosure.

Referring to FIG. 2, the display panel 100 may include a transparent substrate 110, an upper electrode 120, an organic light emitting layer 130, and a lower electrode 140. The transparent substrate 110, the upper electrode 120, the organic light emitting layer 130, and the lower electrode 140 may be sequentially formed. The components of the display panel 100 may be variously disposed depending on a type of an OLED panel. The display panel 100 may include a top emission type display panel and a bottom emission type display panel.

The transparent substrate 110 and the upper electrode 120 may include a transparent material, for example, indium tin oxide (ITO). The lower electrode 140 may include a non-transparent material. However, embodiments are not limited thereto. The lower electrode 140 may include a transparent material, for example, indium tin oxide (ITO). In this case, light may be emitted to a surface of the lower electrode 140.

When a voltage is applied to the upper electrode 120 and lower electrode 140, light emitted from the organic light emitting layer 130 may pass through the upper electrode 120 and the transparent substrate 110 and may be emitted to the outside. In this instance, a light shielding plate may be further formed behind the lower electrode 140, in order to emit forward light emitted to the lower electrode 140.

For example, a display device according to embodiments of the disclosure may be an organic light emitting diode (OLED) display. An active matrix OLED panel includes organic light emitting diodes (OLEDs) capable of emitting light by themselves and has advantages of a fast response time, high emission efficiency, a high luminance, and a wide viewing angle.

The OLED serving as a self-emitting element includes an anode electrode, a cathode electrode, and an organic compound layer between the anode electrode and the cathode electrode. The organic compound layer includes a hole injection layer HIL, a hole transport layer HTL, an emission layer EML, an electron transport layer ETL, and an electron injection layer EIL. When a driving voltage is applied to the anode electrode and the cathode electrode, holes passing through the hole transport layer HTL and electrons passing through the electron transport layer ETL move to the emission layer EML to form excitons. As a result, the emission layer EML generates visible light.

Accordingly, the OLED display has an advantage in reducing volume and weight because it does not require a separate light source. In addition, because the OLED display has a response time that is more than 1,000 times faster than a liquid crystal display, the OLED display may not cause image sticking when displaying an image.

Figure 3:
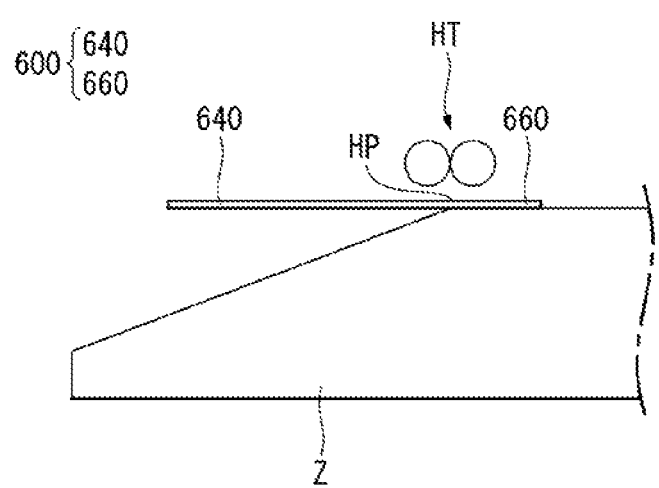
FIGS. 3 and 4 illustrate examples of a plate according to an embodiment of the disclosure.
Figure 4:
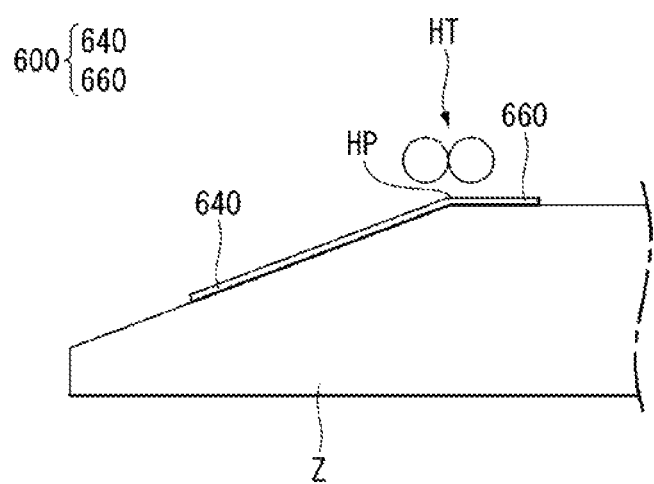

Referring to FIGS. 3 and 4, a plate 600 may be molding-processed. For example, the plate 600 may be glass, tempered glass, transparent plastic, or transparent reinforced plastic. Heat may be applied to a processing point HP of the plate 600. The plate 600 may include a first part 640 and a second part 660. The above-described head 10 may be fixed or coupled to the first part 640. A control box to be described below may be coupled to the second part 660. The processing point HP of the plate 600 may be a boundary between the first part 640 and the second part 660.

The plate 600, of which the processing point HP is heated, may be bent. The first part 640 may be inclined to the second part 660 with respect to the processing point HP, which is soft due to heat, due to a self-load of the first part 640. The first part 640 may be bent until it contacts a metal mold Z positioned at a lower part.

Figure 5:
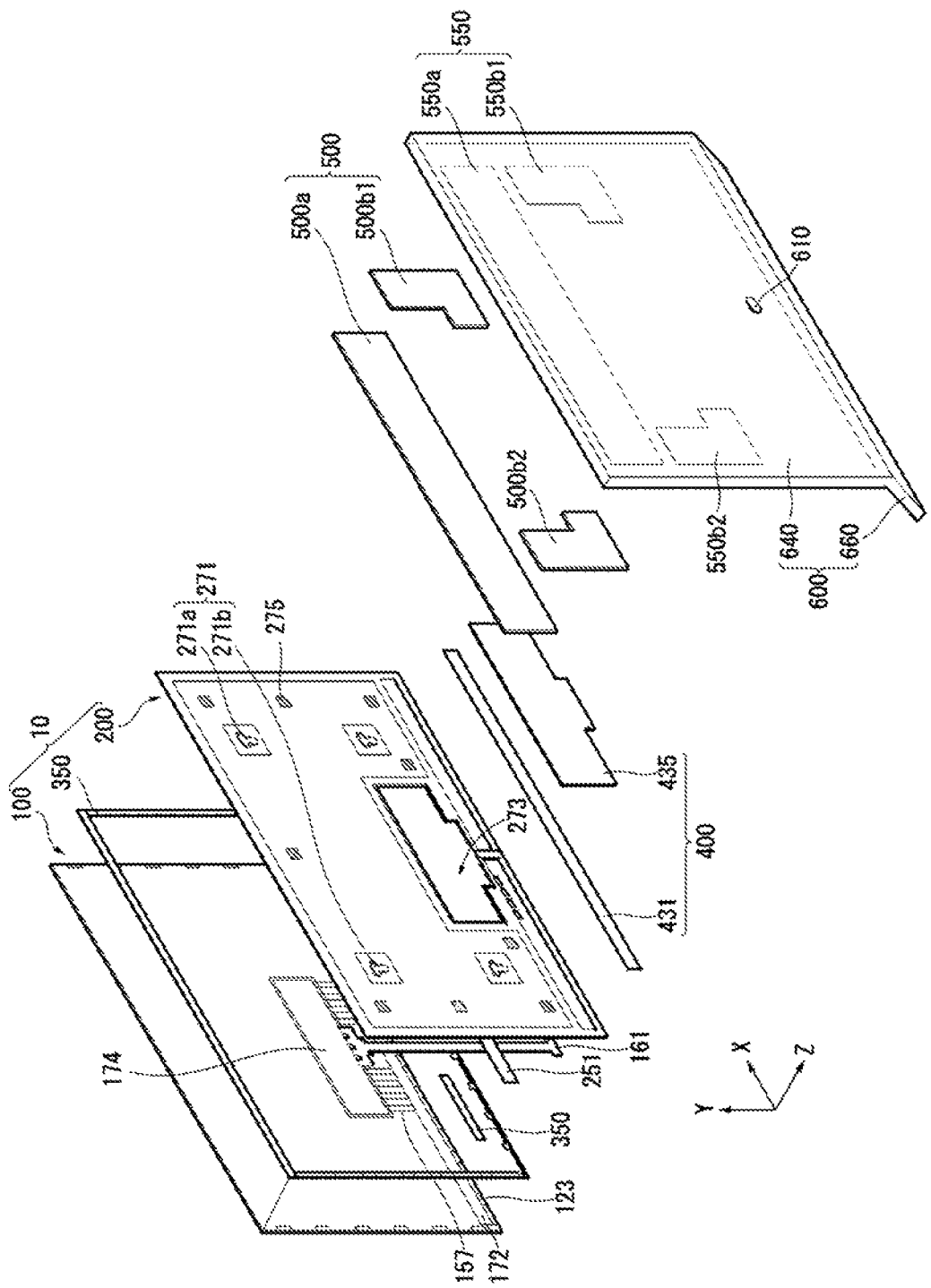
FIGS. 5 to 8 illustrate examples of coupling a display panel and a plate according to an embodiment of the disclosure.

Referring to FIG. 5, the head 10 may include the display panel 100, a module cover 200, and a printed circuit board (PCB) cover 400. The module cover 200 may be referred to as a frame.

The display panel 100 may be provided at a front surface of the head 10 and may display an image. The display panel 100 may divide the image into a plurality of pixels and cause each pixel to emit light while adjusting color, brightness, and chroma of each pixel, thereby outputting an image.

An interface PCB 174 and at least one source PCB 172 may be positioned on a rear surface of the display panel 100. The interface PCB 174 may be positioned on the source PCB 172. The source PCB 172 may be electrically connected to the interface PCB 174. The source PCBs 172 may be positioned to be spaced from one another.

Signal lines for transmitting driving signals, such as timing control signals, and digital video data received from a timing controller board (or referred to as "T-CON board") may be positioned on the interface PCB 174. For example, the signal lines may include a flat cable or a circular cable.

The source PCB 172 may apply a voltage to the display panel 100 in response to a signal received from the interface PCB 174. Namely, the source PCB 172 may apply a driving waveform to the display panel 100 in response to an image signal. The source PCB 172 may be electrically connected to the display panel 100 by a source chip-on film (COF) 123. The source COF 123 connected to one side of the source PCB 172 may be extended to a lower side of the display panel 100 and may be connected to the display panel 100.

The source COF 123 may be electrically connected to the source PCB 172 and data pads of the display panel 100. The source COF 123 may include a data integrated circuit.

An adhesive sheet 350 may be positioned between the display panel 100 and the module cover 200 so as to couple the display panel 100 to the module cover 200. The adhesive sheet 350 may have a rectangular frame shape with an empty center. Electronic components may be accommodated in an empty space at the center of the adhesive sheet 350.

An insulating sheet 251 may be disposed between the display panel 100 and the module cover 200. The insulating sheet 251 may be attached to a front surface of the module cover 200 and may be positioned at a portion corresponding to the source PCB 172. The insulating sheet 251 may include an insulating material so that the source PCB 172 is not electromagnetically interfered with by another electronic device.

The module cover 200 may be provided in the rear of the display panel 100. The display panel 100 may be coupled, fixed, or attached to the module cover 200 through the adhesive sheet 350. The module cover 200 can support the display panel 100. Namely, the module cover 200 can provide rigidity for the display panel 100. To this end, the module cover 200 may include metal. For example, the module cover 200 may include aluminum (Al).

The module cover 200 may be pressed so that it bends. Hence, rigidity of the module cover 200 can be improved. A thickness of an edge portion of the module cover 200 may be greater than a thickness of another portion of the module cover 200. Hence, when the module cover 200 is coupled to a bracket 500, the bracket 500 can be shielded due to the thickness of the edge portion of the module cover 200.

The module cover 200 may have a fastening hole 271. The fastening hole 271 may be a hole penetrating the module cover 200. The fastening hole 271 may include a first fastening hole 271*a* and a second fastening hole 271*b*.

Referring to FIG. 5, the first and second fastening holes 271*a* and 271*b* of the module cover 200 may be formed at a location corresponding to first and second fixing pins 511*a* and 511*b* of the bracket 500. The first fastening hole 271*a* may be positioned on one of the left and right sides of the module cover 200, and the second fastening hole 271*b* may be positioned on the other of the left and right sides of the module cover 200. At least one pair of fastening holes 271 may be formed in the module cover 200.

Figure 6:
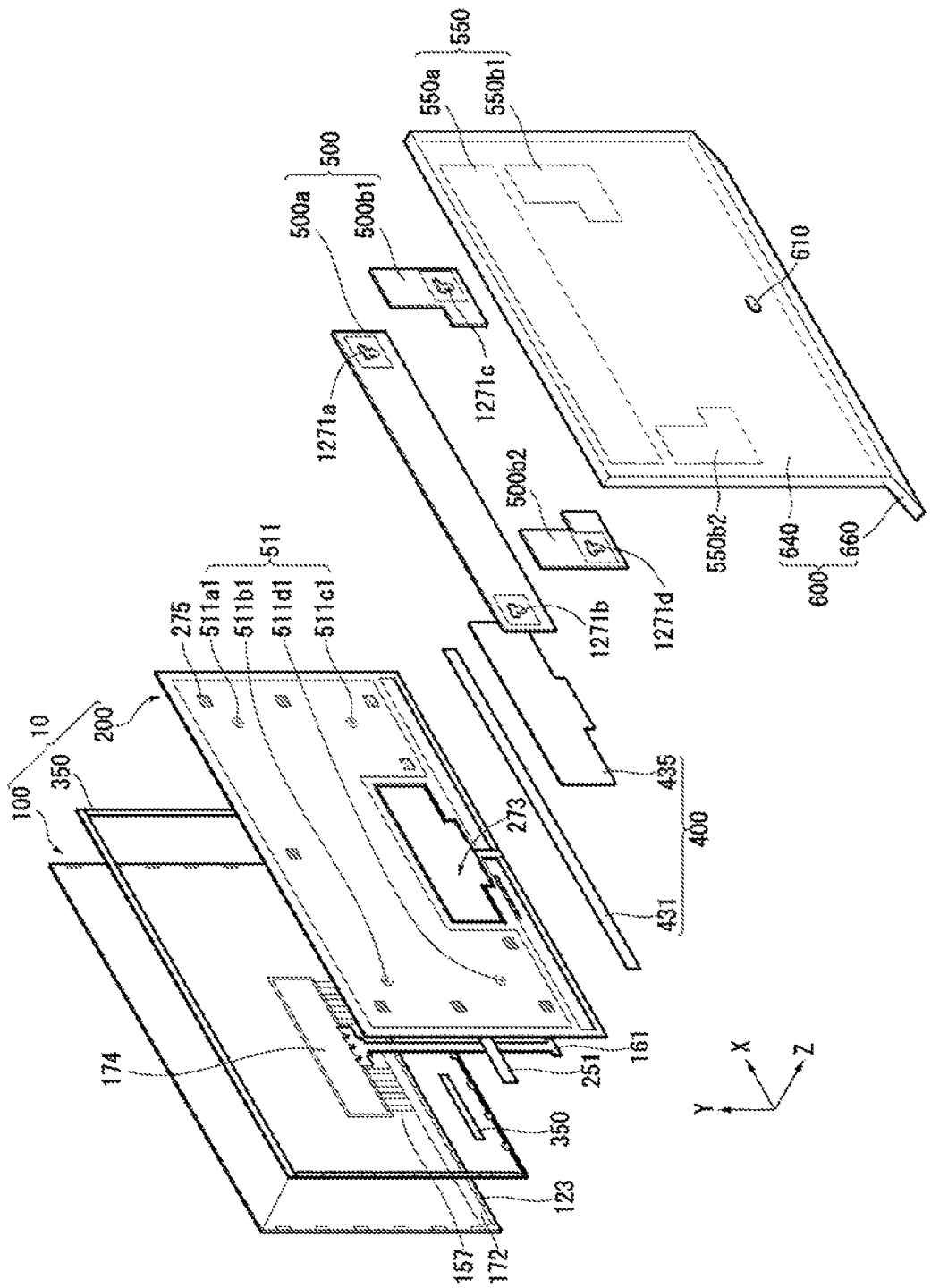

Referring to FIG. 6, the module cover 200 may include a plurality of fixing pins 511*a*1 to 511*d*1. The fixing pin may include first to fourth fixing pins 511*a*1 to 511*d*1. The first to fourth fixing pins 511*a*1 to 511*d*1 may be spaced from each other in the horizontal direction or the vertical direction.

The bracket 500 may include a plurality of fastening holes 1271. The fastening holes 1271 may be holes penetrating the bracket 500. The fastening holes 1271 may include first to fourth fastening holes 1271*a* to 1271*d*. The bracket 500 may include an upper bracket 500*a* and lower brackets 500*b*1 and 500*b*2.

The first to fourth fixing pins 511*a*1 to 511*d*1 of the module cover 200 may be respectively inserted into the first to fourth fastening holes 1271*a* to 1271*d* of the bracket 500.

The first fastening hole 1271*a* may be positioned on one of the left and right sides of the upper bracket 500*a*, and the second fastening hole 1271*b* may be positioned on the other of the left and right sides of the upper bracket 500*a*. The third fastening hole 1271*c* may be positioned on one of the two lower brackets 500*b*1 and 500*b*2, and the fourth fastening hole 1271*d* may be positioned on the other of the two lower brackets 500*b*1 and 500*b*2.

Referring to FIGS. 5 and 6, the module cover 200 may include a plurality of coupling auxiliary members 275. The coupling auxiliary members 275 may be positioned between the module cover 200 and the bracket 500. The coupling auxiliary members 275 may be positioned or fixed to the rear surface of the module cover 200. The coupling auxiliary members 275 may be positioned to be spaced from one another at a predetermined distance in the edge portion of the module cover 200. The coupling auxiliary members 275 may be positioned on a front surface of the bracket 500.

The coupling auxiliary members 275 may include a magnetic material. For example, the coupling auxiliary members 275 may include a magnetic substance. The coupling auxiliary members 275 may couple or fix the module cover 200 to the bracket 500 through a magnetic force. Hence, the module cover 200 can be more firmly fixed to the bracket 500.

The module cover 200 may include an opening 273 at a location corresponding to the interface PCB 174. Namely, the opening 273 may be positioned in the center of the module cover 200. The opening 273 may provide a space for the interface PCB 174 in an area between the display panel 100 and the module cover 200.

The PCB cover 400 may include a first PCB cover 431 and a second PCB cover 435. The first PCB cover 431 may be positioned in a portion corresponding to the source PCB 172, and the second PCB cover 435 may be positioned in a portion corresponding to the interface PCB 174. Namely, the second PCB cover 435 may cover the opening 273.

The PCB cover 400 may include an insulating material so that the source PCB 172 and the interface PCB 174 are not electromagnetically interfered with by another electronic device. For example, the PCB cover 400 may include a plastic material. Thus, the PCB cover 400 can protect the source PCB 172 and the interface PCB 174 from a leakage current.

Figure 7:
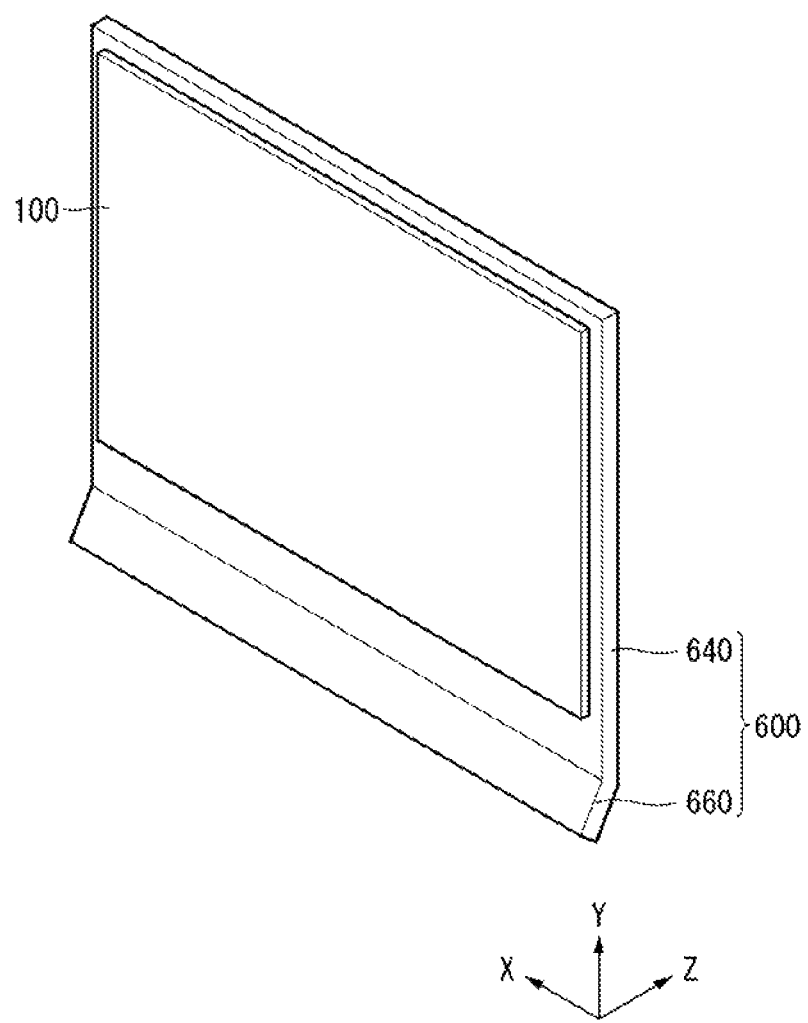

Referring to FIG. 7, the display panel 100 may be coupled to a front surface of the plate 600. The display panel 100 may be coupled to the first part 640 of the plate 600.

Figure 8:
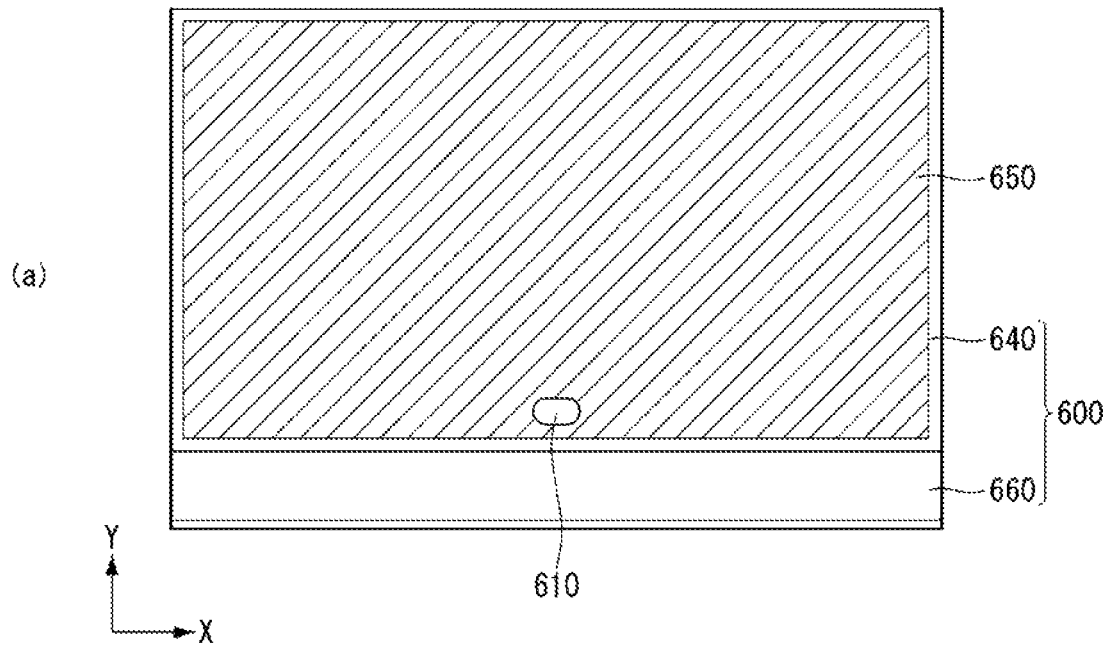
Figure 8:
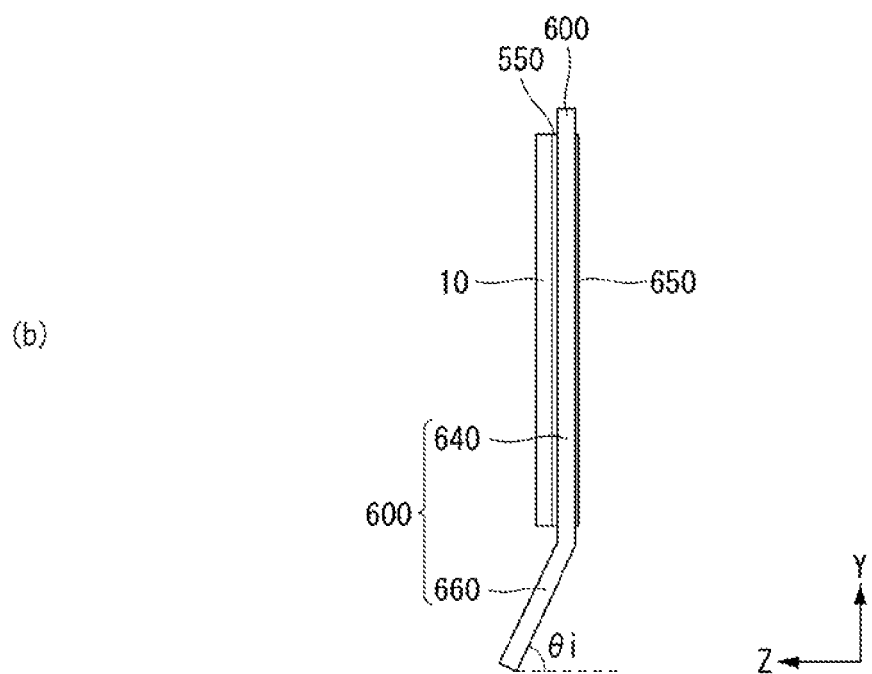

Referring to FIG. 8, a reinforced film 650 may be positioned on a rear surface of the plate 600. The reinforced film 650 can protect the plate 600 and complement rigidity of the plate 600. For example, when the plate 600 is formed of glass, the reinforced film 650 can reinforce brittleness of the plate 600 formed of glass.

The reinforced film 650 may include an opaque material. The reinforced film 650 may block light that may be emitted to the front of the plate 600 through the rear of the plate 600.

The second part 660 may have an angle $\theta i$ to the Z-axis. The angle $\theta i$ may be an acute angle.

Figure 9:
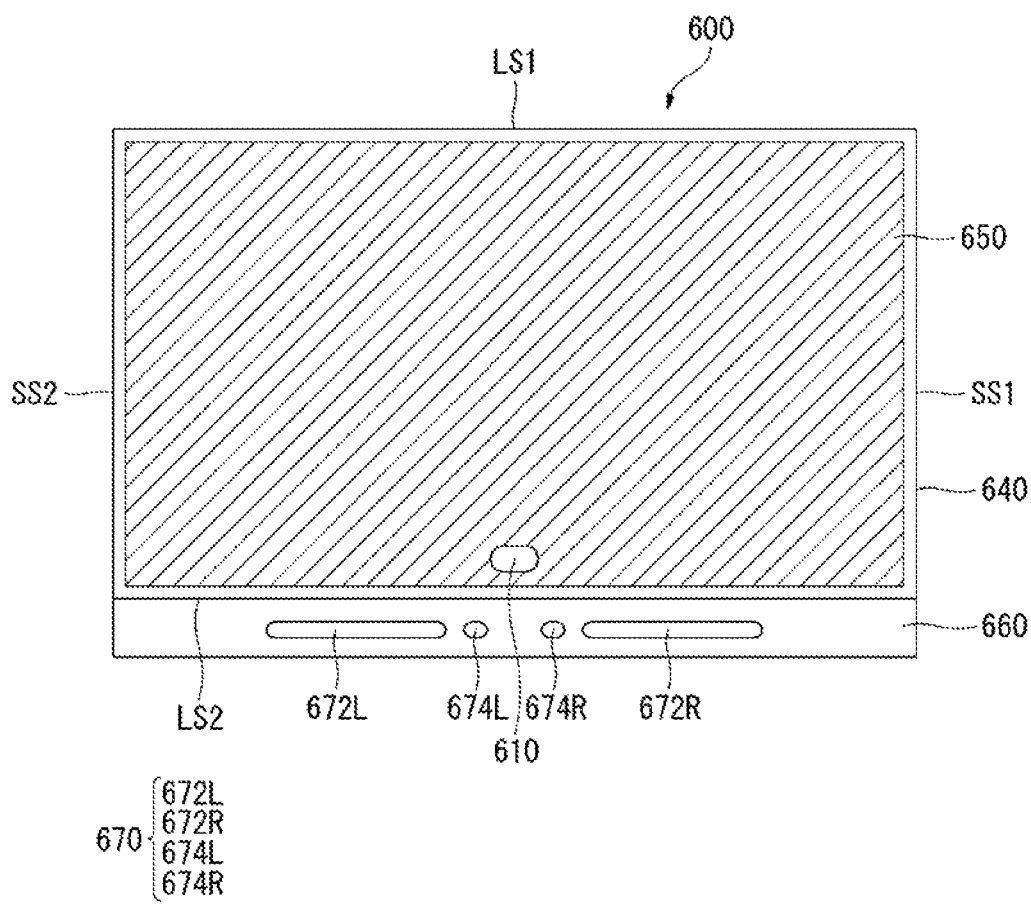
FIGS. 9 to 11 illustrate examples of a structure of a plate according to an embodiment of the disclosure.

Referring to FIG. 9, the plate 600 may include a line hole 610. The line hole 610 may be formed in the first part 640. The line hole 610 may be positioned adjacent to a lower side (i.e., the second long side LS2) of the first part 640 at the center of the plate 600. The plate 600 may include fixing holes 670. The fixing holes 670 may include first to fourth fixing holes 672L, 672R, 674L and 674R. The first fixing hole 672L and/or the second fixing hole 672R may be extended. The third fixing hole 674L and/or the fourth fixing hole 674R may be relatively shorter than the first fixing hole 672L and/or the second fixing hole 672R.

The first fixing hole 672L may be formed in the second part 660 of the plate 600 and may be extended along the lower side (i.e., the second long side LS2) of the first part 640. For example, the first fixing hole 672L may be parallel to the lower side (i.e., the second long side LS2) of the first part 640. The third fixing hole 674L may be positioned adjacent to the first fixing hole 672L. The second fixing hole 672R may be symmetrical with the first fixing hole 672L, and the fourth fixing hole 674R may be symmetrical with the third fixing hole 674L. In this instance, the third fixing hole 674L and the fourth fixing hole 674R may be positioned between the first fixing hole 672L and the second fixing hole 672R.

Figure 10:
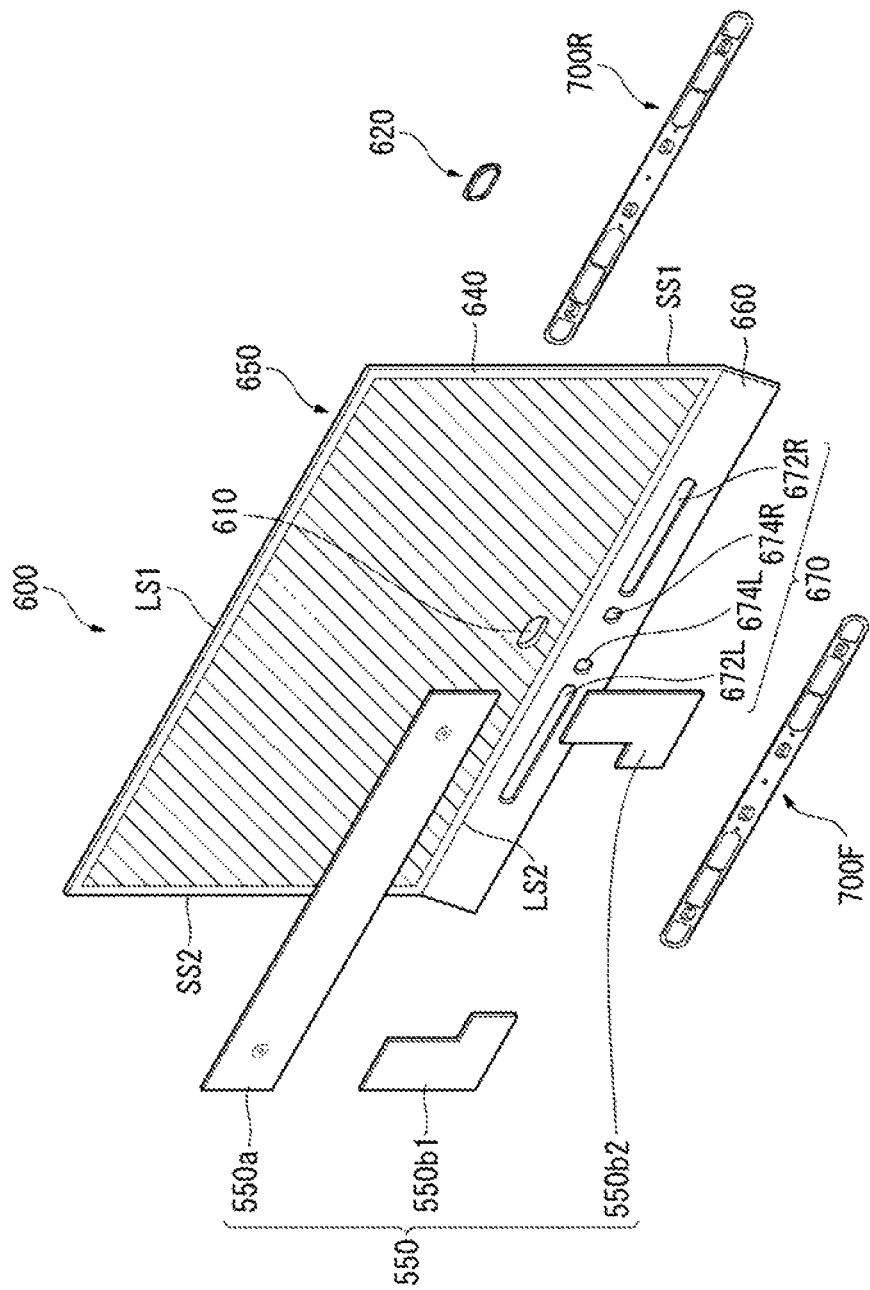

Referring to FIG. 10, a front bracket 700F may be positioned in front or on a front surface of the second part 660 of the plate 600. The front bracket 700F may be extended along the lower side (i.e., the second long side LS2) of the first part 640 of the plate 600 and may be disposed in parallel to the lower side (i.e., the second long side LS2) of the first part 640. In this instance, the front bracket 700F may correspond to or face the fixing holes 670.

A rear bracket 700R may be positioned in the rear or on a rear surface of the second part 660 of the plate 600. The rear bracket 700R may be extended along the lower side LS2 of the first part 640 of the plate 600 and may be disposed in parallel to the lower side LS2 of the first part 640. In this instance, the rear bracket 700R may correspond to or face the fixing holes 670. The rear bracket 700R may be positioned opposite the front bracket 700F with the plate 600 interposed therebetween.

The front bracket 700F may be referred to as a first bracket 700F, and the rear bracket 700R may be referred to as a second bracket 700R. A line ring 620 may be inserted into the line hole 610.

Figure 11:
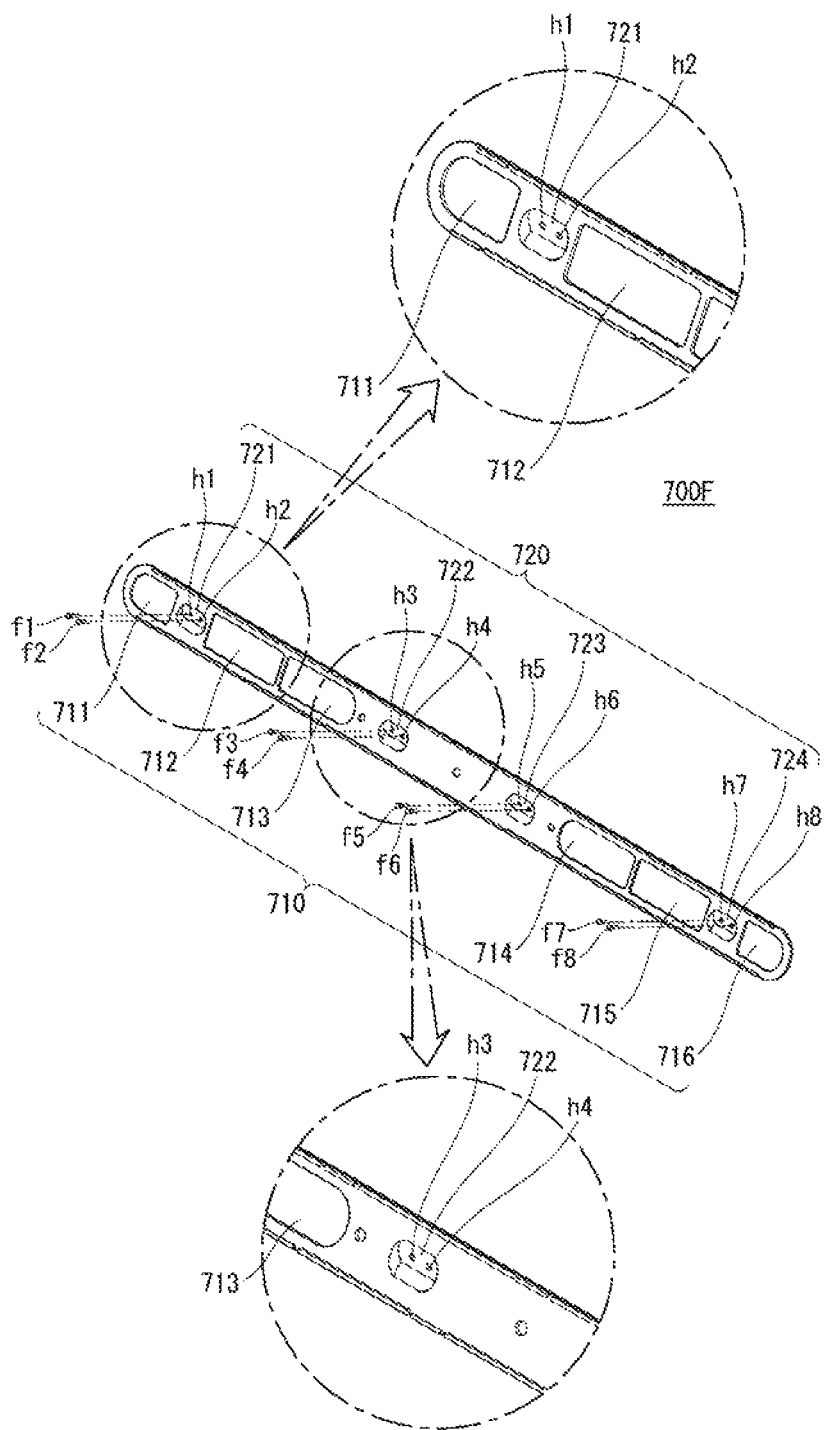

Referring to FIG. 11, the front bracket 700F may include an opening 710 and a depression 720. The opening 710 may include first to sixth openings 711 to 716. When the front bracket 700F is positioned on the front surface of the second part 660 of the plate 600 (see FIG. 10), the first to third openings 711 to 713 may be positioned corresponding to the first fixing hole 672L (see FIG. 9), and the fourth to sixth openings 714 to 716 may be positioned corresponding to the second fixing hole 672R (see FIG. 9). The second to fifth openings 712 to 715 may have a shape corresponding to a shape of a front surface of a speaker unit to be described later.

The depression 720 may include first to fourth depressions 721 to 724. The depression 720 may protrude toward the rear of the front bracket 700F. Namely, the depression 720 may be recessed from a front surface of the front bracket 700F and may protrude toward a rear surface of the front bracket 700F. The first depression 721 may be positioned between the first opening 711 and the second opening 712, the second depression 722 may be positioned adjacent to the third opening 713, the third depression 723 may be positioned adjacent to the fourth opening 714, and the fourth depression 724 may be positioned between the fifth opening 715 and the sixth opening 716. The depression 720 may include a hole h. The hole h may include a plurality of holes h1 to h8. Fastening members f1 to f8 may be inserted into the holes h1 to h8 or may pass through the holes h1 to h8.

Figure 12:
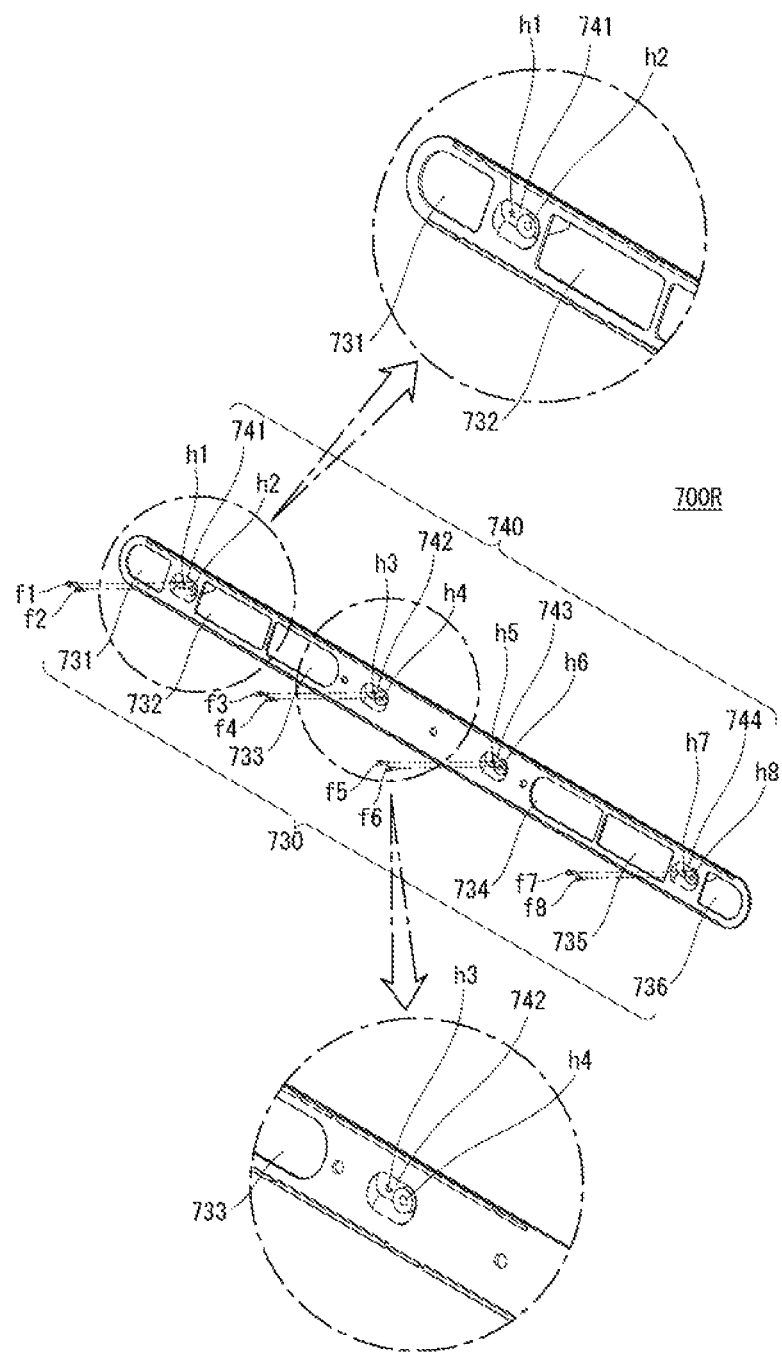
FIGS. 12 and 13 illustrate a rear bracket of a plate according to an embodiment of the disclosure.
Figure 13:
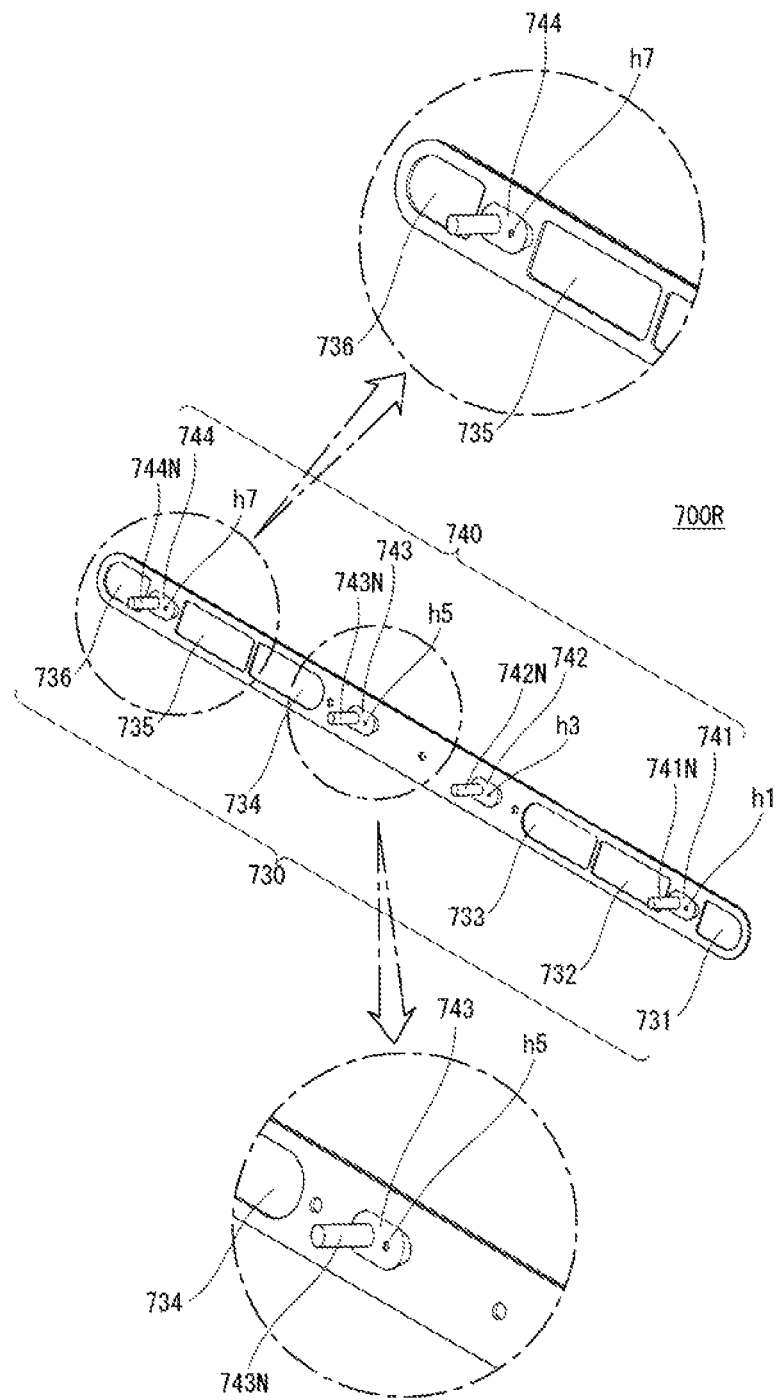

Referring to FIGS. 12 and 13, the rear bracket 700R may include an opening 730 and a depression 740. The opening 730 may include first to sixth openings 731 to 736. When the rear bracket 700R is positioned on the rear surface of the second part 660 of the plate 600 (see FIG. 10), the first to third openings 731 to 733 may be positioned corresponding to the first fixing hole 672L (see FIG. 9), and the fourth to sixth openings 734 to 736 may be positioned corresponding to the second fixing hole 672R (see FIG. 9). The second to fifth openings 732 to 735 may have a shape corresponding to the shape of the front surface of the speaker unit to be described later.

The depression 740 may include first to fourth depressions 741 to 744. The depression 740 may protrude toward the rear of the rear bracket 700R. Namely, the depression 740 may be recessed from a front surface of the rear bracket 700R and may protrude toward a rear surface of the rear bracket 700R. The first depression 741 may be positioned between the first opening 731 and the second opening 732, the second depression 742 may be positioned adjacent to the third opening 733, the third depression 743 may be positioned adjacent to the fourth opening 734, and the fourth depression 744 may be positioned between the fifth opening 735 and the sixth opening 736. The depression 740 may include a hole h. The hole h may include a plurality of holes h1 to h8. Fastening members f1 to f8 may be inserted into the holes h1 to h8 or may pass through the holes h1 to h8.

Figure 14:
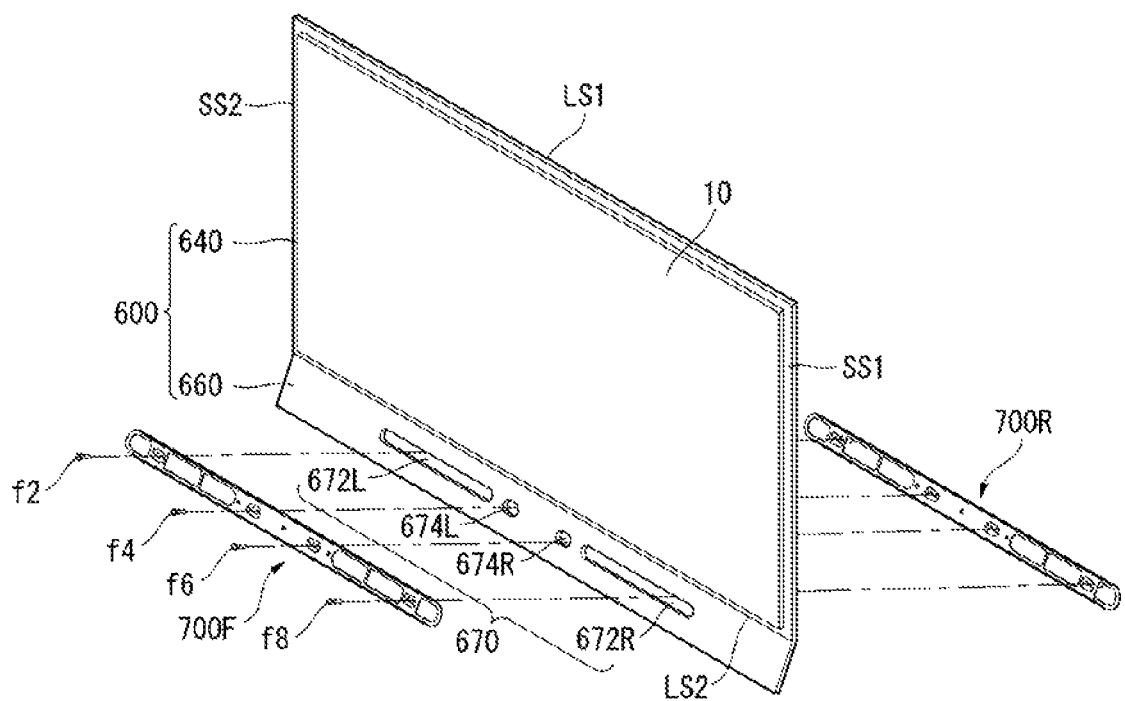
FIGS. 14 to 16 illustrate a front bracket and a rear bracket fixed to a plate according to an embodiment of the present disclosure.
Figure 15:
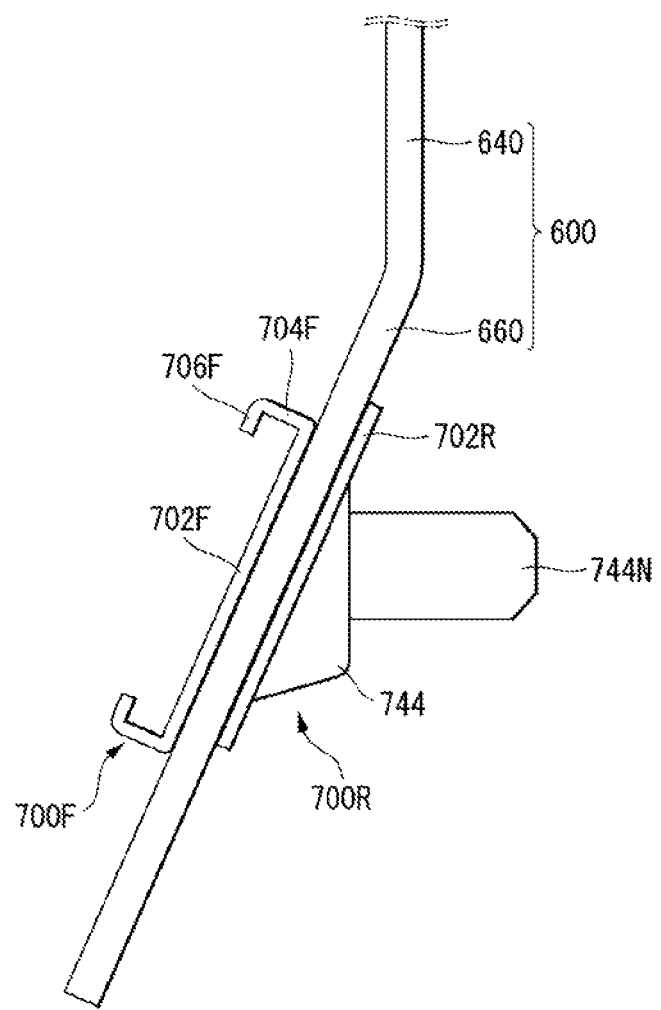
Figure 16:
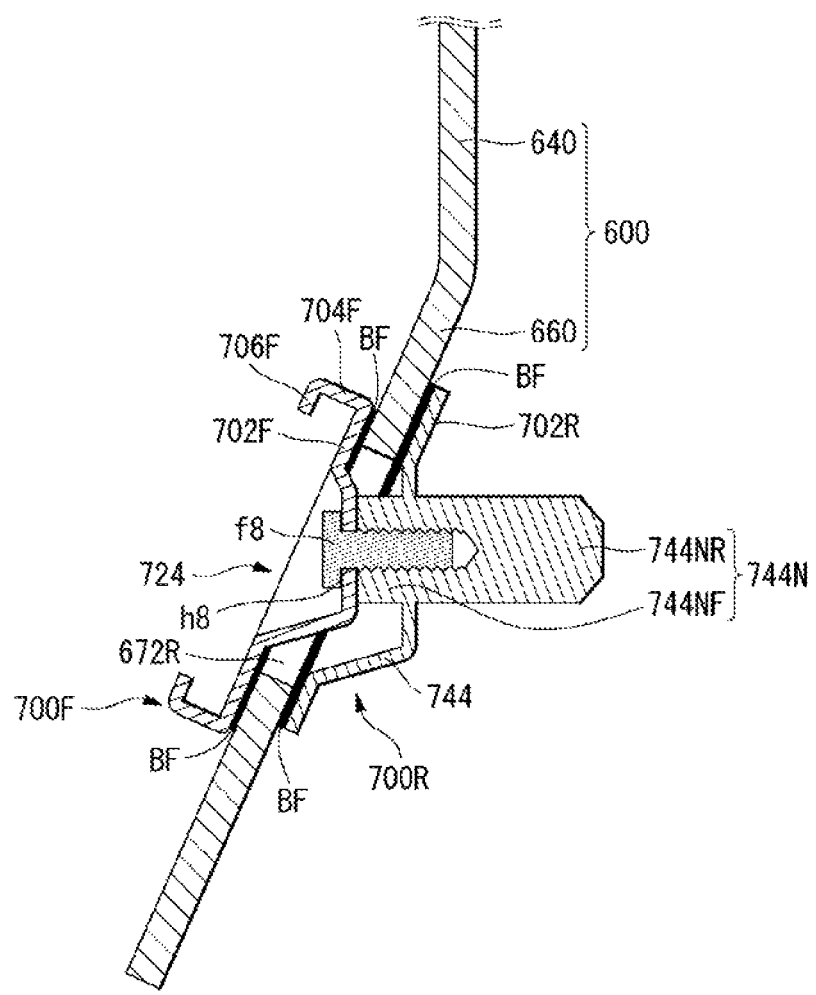

Referring to FIGS. 14 to 16, the second part 660 of the plate 600 may be positioned between the front bracket 700F and the rear bracket 700R, fixed between the front bracket 700F and the rear bracket 700R, or pressed by the front bracket 700F and the rear bracket 700R.

The front bracket 700F may include a fixing portion 702F, a side wall 704F, and a flange 706F. The fixing portion 702F may be positioned on the front surface of the second part 660 of the plate 600 or may contact the front surface of the second part 660. A buffer layer BF may be positioned between the fixing portion 702F of the front bracket 700F and the front surface of the second part 660 of the plate 600. For example, the buffer layer BF may be a synthetic resin or a double-sided tape. The buffer layer BF can strengthen a coupling force of the front bracket 700F, the rear bracket 700R, and the plate 600 and can prevent a damage of the plate 600. The side wall 704F and/or the flange 706F can reinforce overall rigidity of the front bracket 700F, and a speaker cover described later may be coupled to the side wall 704F.

The rear bracket 700R may include a fixing portion 702R and a support shaft 744N. The fixing portion 702R may be positioned on the rear surface of the second part 660 of the plate 600 or may contact the rear surface of the second part 660. A buffer layer BF may be positioned between the fixing portion 702R of the rear bracket 700R and the rear surface of the second part 660 of the plate 600. For example, the buffer layer BF may be a synthetic resin or a double-sided tape. The buffer layer BF can strengthen a coupling force of the front bracket 700F, the rear bracket 700R, and the plate 600 and can prevent a damage of the plate 600.

The support shaft 744N may be extended from the depression 744 to the front and/or the rear of the rear bracket 700R. The support shaft 744N may include a front portion 744NF and a rear portion 744NR. The front portion 744NF may be extended from the depression 744 to the front of the rear bracket 700R, and the rear portion 744NR may be extended from the depression 744 to the rear of the rear bracket 700R. A length of the rear portion 744NR may be greater than a length of the front portion 744NF. The front portion 744NF of the support shaft 744N may be adjacent to a rear surface of the depression 724 of the front bracket 700F through the fixing hole 670 of the second part 660 of the plate 600, or may contact the rear surface of the depression 724. Support shafts 741N, 742N, 743N and 744N may be formed on the rear surface of the rear bracket 700R at locations corresponding to the holes h2, h4, h6 and h8 of the rear bracket 700R.

The fastening member f8 may pass through the hole h8 of the front bracket 700F and the hole h8 of the rear bracket 700R and may be inserted into the support shaft 744N of the rear bracket 700R. The fastening member f8 may be screwed to the support shaft 744N. The description of the other fastening members f2, f4 and f6 is the same as the description of the fastening member f8.

Figure 17:
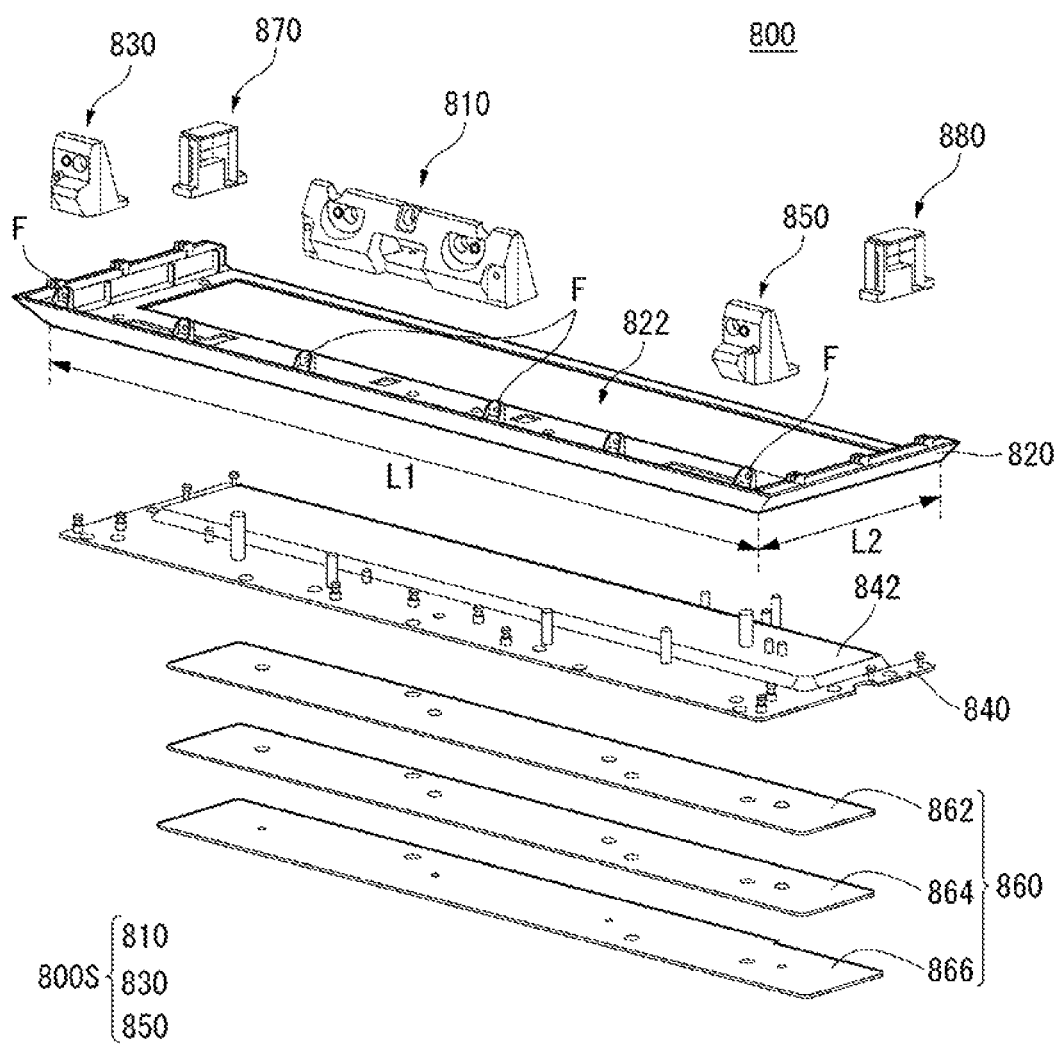
FIGS. 17 to 22 illustrate examples of coupling a plate and a housing according to an embodiment of the disclosure.

Referring to FIG. 17, a supporter frame 820 may be extended in the left-right direction and extended in the front-rear direction. An extension length L1 in the left-right direction may be greater than an extension length L2 in the front-rear direction. The supporter frame 820 may include an opening 822 at the center. The supporter frame 820 may include a metal material and may include a synthetic resin. The supporter frame 820 may include fixed bosses F. The fixed bosses F may be sequentially positioned at the front side of the supporter frame 820 at regular intervals.

A bottom plate 840 may be positioned on a lower part or a lower surface of the supporter frame 820. The bottom plate 840 may be coupled to the lower part of the supporter frame 820. The bottom plate 840 may include a dome 842. The dome 842 may be positioned in the opening 822 of the supporter frame 820. Namely, when the bottom plate 840 is coupled to the lower part of the supporter frame 820, the dome 842 may be inserted into the opening 822 of the supporter frame 820.

A supporter weight 860 may be coupled or fixed to a lower part of the bottom plate 840. The supporter weight 860 may be accommodated in the dome 840 of the bottom plate 840. The supporter weight 860 may include a plurality of plates 862, 864 and 866. The weight, the number, etc. of the supporter weight 860 may be changed depending on the size of the screen of the display device. The supporter weight 860 may include a metal.

A supporter 800S may include a first supporter 810, a second supporter 830, and a third supporter 850. The first supporter 810 may be referred to as a center supporter 810, and the second supporter 830 and/or the third supporter 850 may be referred to as side supporters 830 and 850.

The first supporter 810 may be positioned in the center of the supporter frame 820 and may be fixed to the supporter frame 820. The second supporter 830 and the third supporter 850 may be positioned on the left and right sides of the supporter frame 820 and may be fixed to the supporter frame 820.

Tilting units 870 and 880 may be fixed or coupled to the supporter frame 820. The tilting units 870 and 880 may include a first tilting unit 870 and a second tilting unit 880. The first tilting unit 870 may be positioned on the left side of the supporter frame 820, and the second tilting unit 880 may be positioned on the right side of the supporter frame 820.

Figure 18:
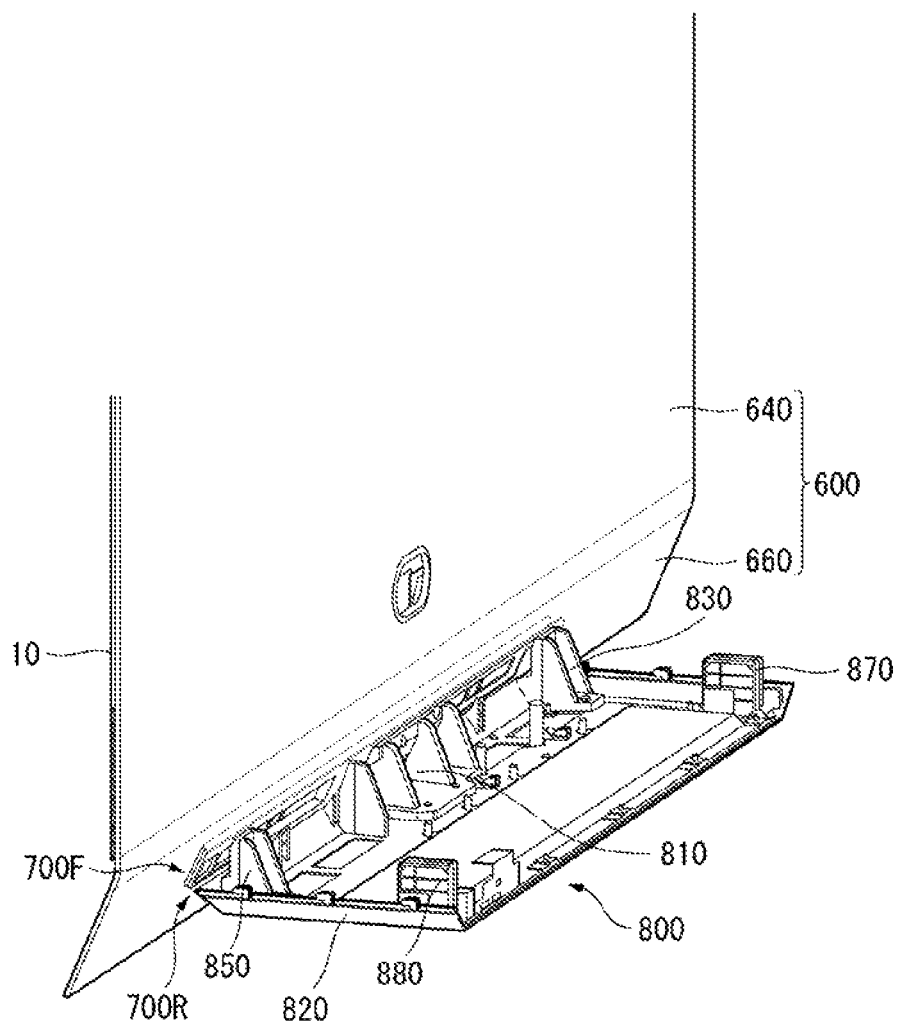
Figure 19:
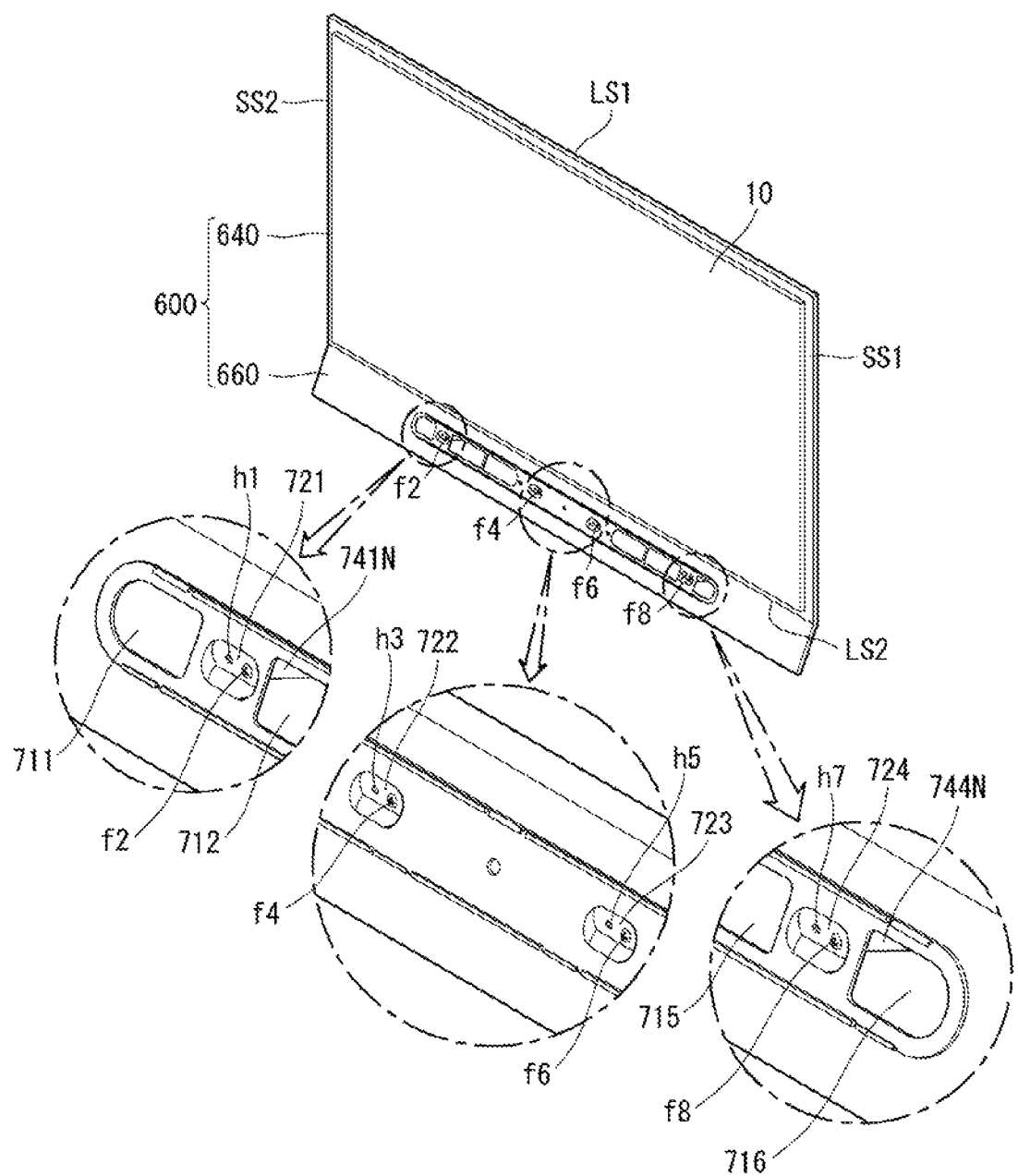
Figure 20:
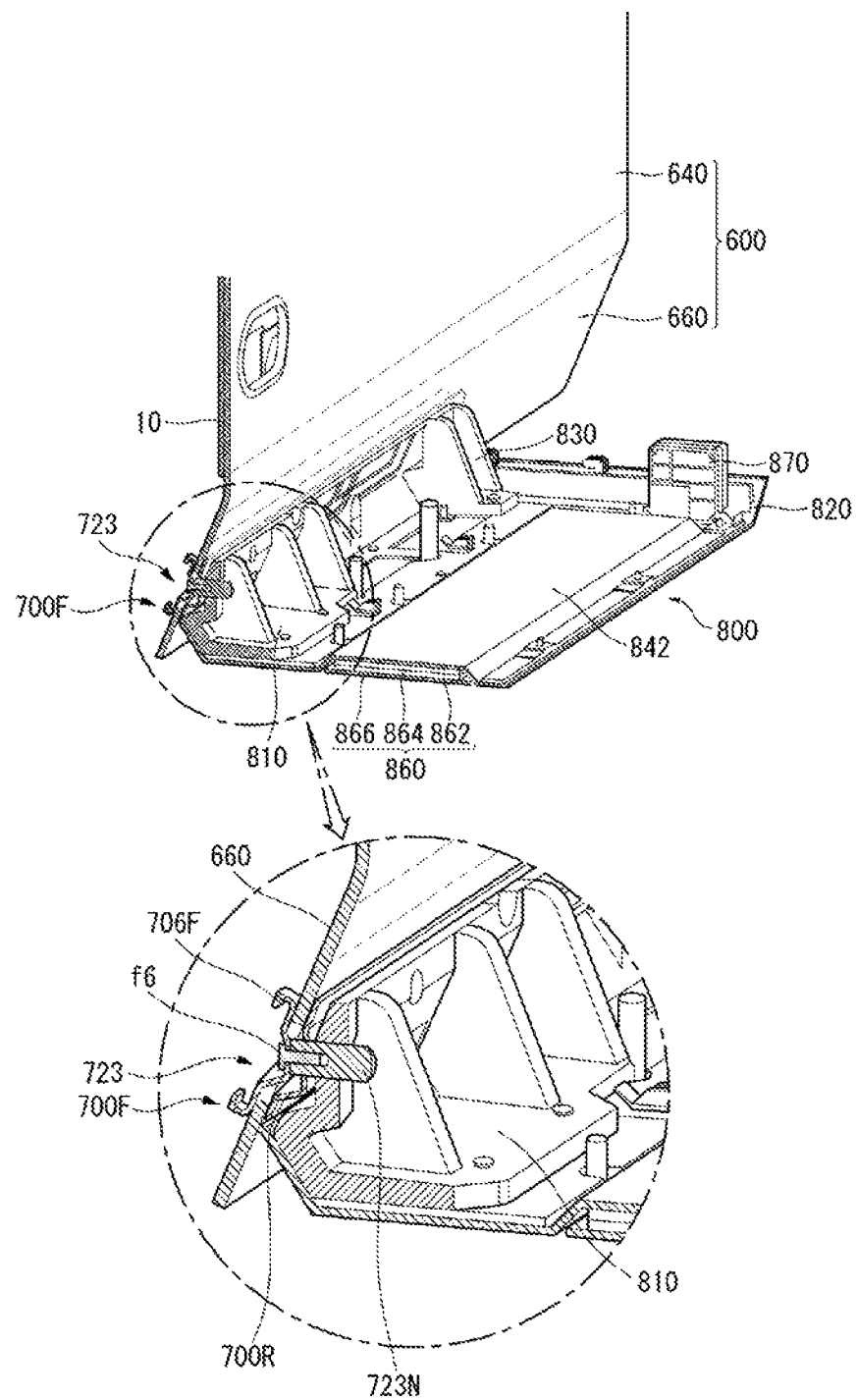

Referring to FIGS. 18 to 20, a housing may be coupled to the plate. The housing may be coupled or fixed to the second part of the plate. A housing 800 may be coupled to the rear surface of the second part 660 of the plate 600. In this instance, the coupling between the housing 800 and the second part 660 of the plate 600 may be achieved by a structure in which the front bracket 700F is fixed to the front surface of the second part 660 of the plate 600, the rear bracket 700R is fixed to the rear surface of the second part 660 of the plate 600, the front bracket 700F and the rear bracket 700R are fixed by the fastening members f2, f4, f6 and f8, and the support shafts 741N, 742N, 743N and 744N and/or the fastening members f1, f3, f5 and f7 are fastened or fixed to the supporters 810, 830 and 850. The fastening members f1, f3, f5 and f7 may be coupled to the supporters 810, 830 and 850 of the housing 800 through the holes h1, h3, h5 and h7 of each of the front bracket 700F and the rear bracket 700R. The supporters 810 and 830 may be fixed or mounted on the supporter frame 820. The fastening members f2, f4, f6 and f8 may pass through the holes h2, h4, h6 and h8 of each of the front bracket 700F and the rear bracket 700R and may be inserted into or fastened to the support shafts 741N, 742N, 743N and 744N. The support shafts 741N, 742N, 743N and 744N may be inserted into insertion portions of the supporters 810, 830 and 850. The coupling between the support shafts 741N, 742N, 743N and 744N and the supporters 810, 830 and 850 may be the temporary fixation performed so that the fastening members f1, f3, f5 and f7 are easily coupled to the supporters 810, 830 and 850 of the housing 800 through the holes h1, h3, h5 and h7 of each of the front bracket 700F and the rear bracket 700R. Further, after the fastening members f1, f3, f5 and f7 are coupled to the supporters 810, 830 and 850 of the housing 800 through the holes h1, h3, h5 and h7 of each of the front bracket 700F and the rear bracket 700R, the coupling between the support shafts 741N, 742N, 743N and 744N and the supporters 810, 830 and 850 can provide the rigidity for the coupling structure of the plate 600 and the housing 800.

Figure 21:
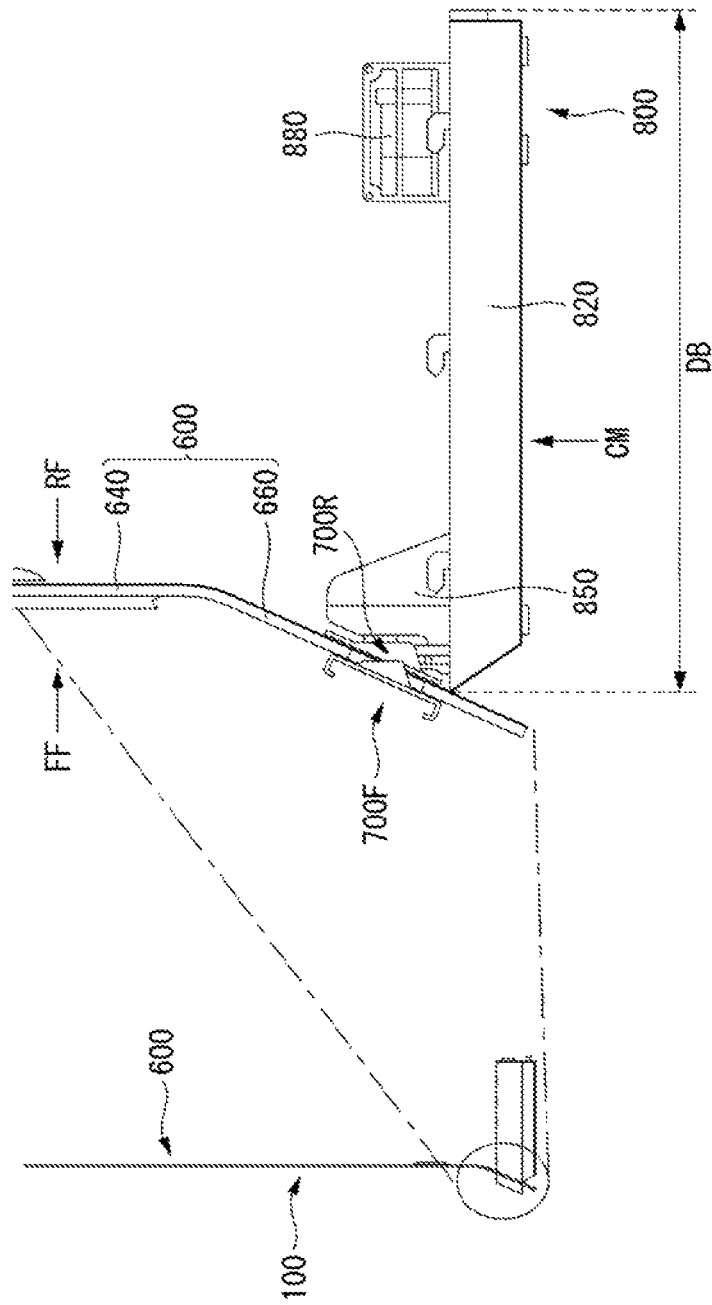

Referring to FIG. 21, as the second part 660 of the plate 600 is bent from the first part 640 and is fixed to the front, the front side, or the front surface of the housing 800, center of gravity CM of the plate 600 and the housing 800 may be positioned at the front of the housing 800 adjacent to the center of the housing 800. Hence, when an external force FF is applied to the front of the plate 600, the structural stability of the display device 100 can be secured by a length from the front to the rear of the housing 800.

On the contrary, when an external force RF is applied to the rear of the plate 600, the supporter weight 860 (see FIG. 20) included in the housing 800 can prevent the display device 100 from being turned over.

Namely, the stability of the center of gravity of the display device, which may occur when the plate 600 is coupled to the front of the housing 800, can be secured by the bending of the plate 600.

Figure 22:
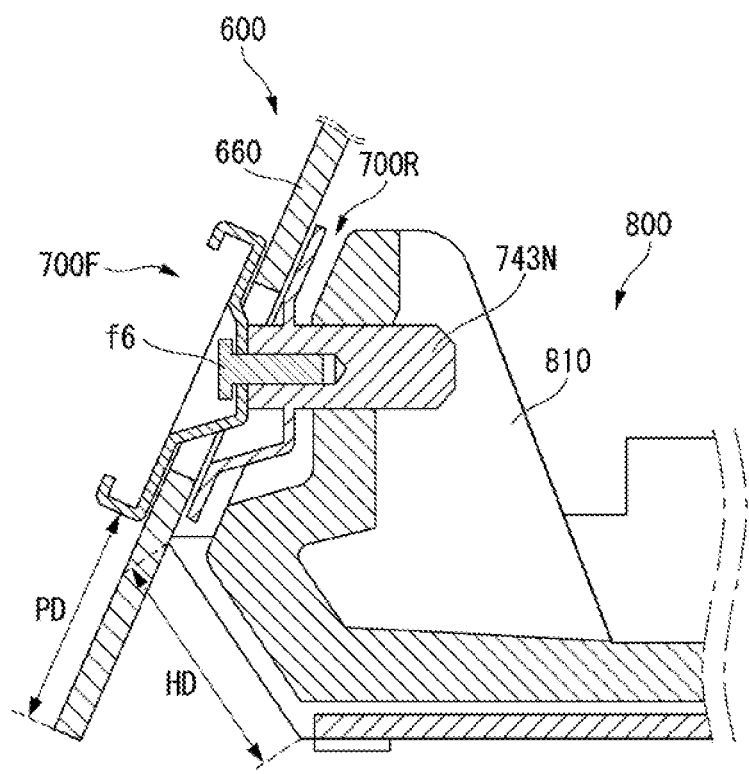

Referring to FIG. 22, a lower end PD of the second part 660 of the plate 600 may have a predetermined length. The housing 800 may include a retreating portion HD. The retreating portion HD may be spaced from the lower end PD of the plate 600. In this instance, the length of the lower end PD of the plate 600 may be substantially the same as a length of the retreating portion HD of the housing 800. For example, the lower end PD of the plate 600 may form a triangle with the retreating portion HD of the housing 800. Hence, the lower end PD of the plate 600 can prevent the display device from being turned over forward.

Figure 23:
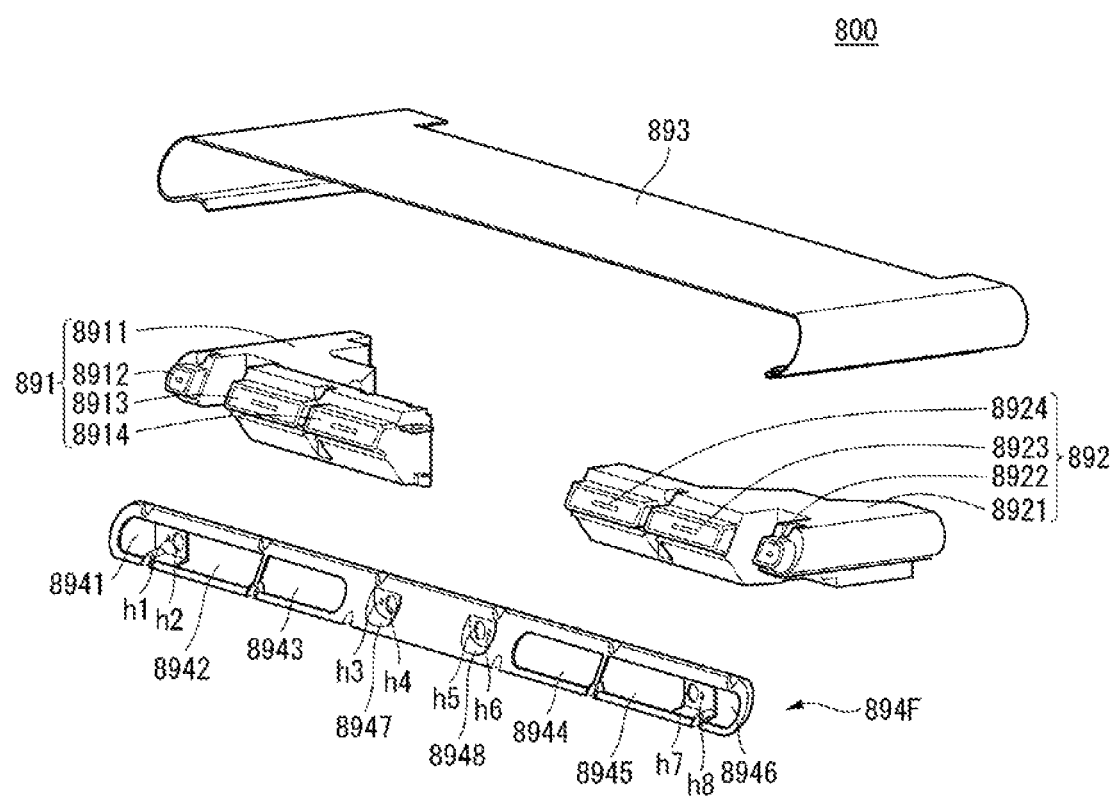
FIGS. 23 to 43 illustrate examples of a structure of a housing according to an embodiment of the disclosure.

Referring to FIG. 23, the housing 800 may include speaker units 891 and 892, a front cover 894F, and a top cover 893. The speaker units 891 and 892 may include a first speaker unit 891 and a second speaker unit 892. The description of the first speaker unit 891 may be equally applied to the second speaker unit 892. The first speaker unit 891 may include a body 8911, a first speaker 8912, a second speaker 8913, and a third speaker 8914. The body 8911 may provide an empty space. The empty space may communicate with the first to third speakers 8912, 8913 and 8914. The first speaker 8912 may provide a high-frequency sound. The second speaker 8913 may provide a low-frequency sound. The third speaker 8914 may provide a mid-frequency sound or a voice frequency sound. For example, the first speaker 8912 may be a tweeter, the second speaker 8913 may be a woofer, and the third speaker 8914 may be a middle range speaker. The top cover 893 may be positioned on the first speaker unit 891 and/or the second speaker unit 892 and may cover them. The top cover 893 may be a flat plate, and the left and right sides of the top cover 893 may be rounded. When the housing 800 is viewed from the front, the first speaker unit 891 may be positioned on the left side of the top cover 893, and the second speaker unit 892 may be positioned on the right side of the top cover 893.

The front cover 894F may be positioned in front of the top cover 893. The front cover 894F may be positioned in front of the first speaker unit 891 and/or the second speaker unit 892. The front cover 894F may include first to sixth openings 8941 to 8946. The first opening 8941 may correspond to the first speaker 8912 of the first speaker unit 891, the second opening 8942 may correspond to the second speaker 8913 of the first speaker unit 891, and the third opening 8943 may correspond to the third speaker 8914 of the first speaker unit 891. The fourth opening 8944 may correspond to a third speaker 8924 of the second speaker unit 892, the fifth opening 8945 may correspond to a second speaker 8923 of the second speaker unit 892, and the sixth opening 8946 may correspond to a first speaker 8922 of the second speaker unit 892. The front cover 894F may include depressions 8947 and 8948. The description of the depressions 8947 and 8948 equally uses the description of the front bracket 700F or the rear bracket 700R described above. The front cover 894F may include a plurality of holes h1 to h8. The description of the holes h1 to h8 equally uses the description of the front bracket 700F or the rear bracket 700R described above. The front cover 894F may include depressions 8941A and 8941B.

Figure 24:
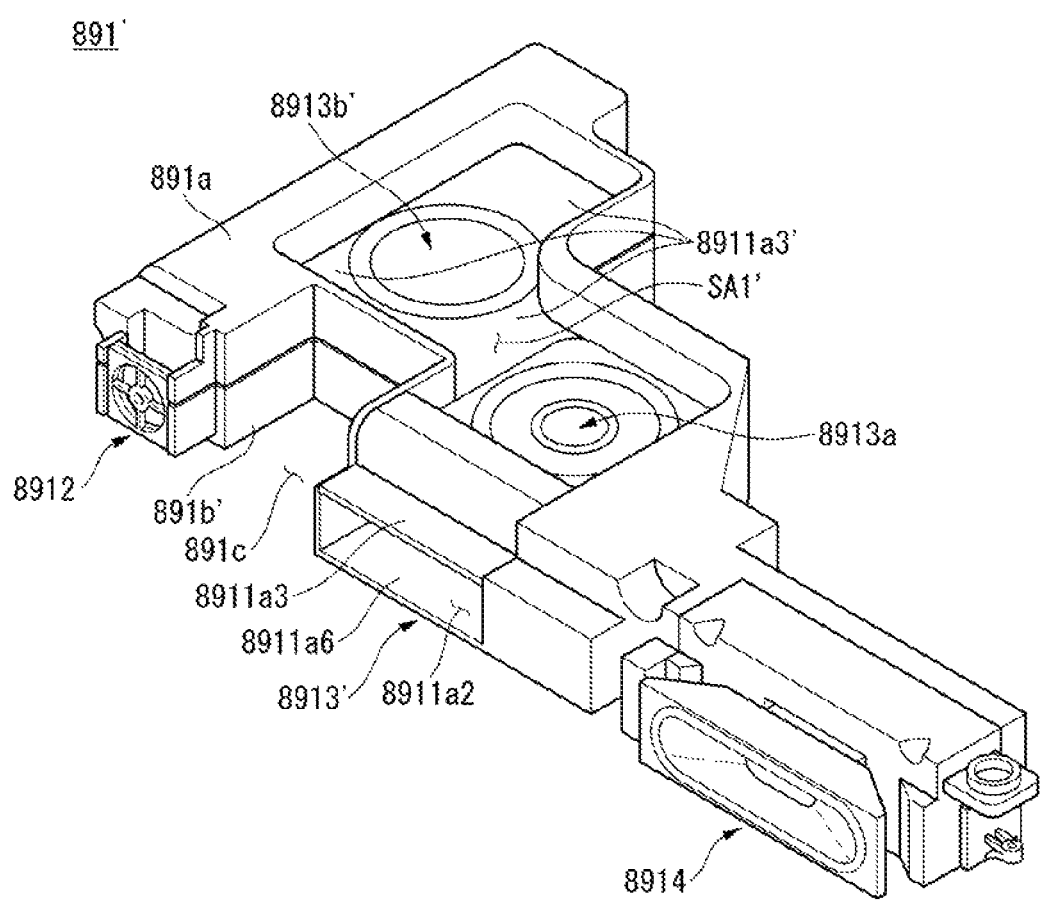

Referring to FIG. 24, a body 891' may include a first sub-body 891a' and a second sub-body 891b'. The first sub-body 891a' and the second sub-body 891b' may be fastened to each other. The body 891' may be referred to as a speaker unit 891'. A second speaker 8913' may be referred to as a speaker unit 8913'. The body 891' may provide a space therein. A plate 8911a3' may divide the space. The space may be divided into an upper space SA1' and a lower space. A speaker 8913a may be installed on the plate 8911a3'. The speaker 8913a may receive electric power. A dust cap, an edge, or a diaphragm of the speaker 8913a may face the upper space SA1'. A speaker 8913b' may be installed on the plate 8911a3'. The speaker 8913b' may not receive electric power. The speaker 8913b' may be referred to as a passive speaker 8913b' or a diaphragm 8913b'. A diaphragm or an edge of the speaker 8913b' may face the upper space SA1'. The second speaker 8913' may include speakers 8913a and 8913b'. The upper space SA1' and the lower space may be dividedly formed by installing the speakers 8913a and 8913b'. The lower space may be an enclosed space.

Figure 25:
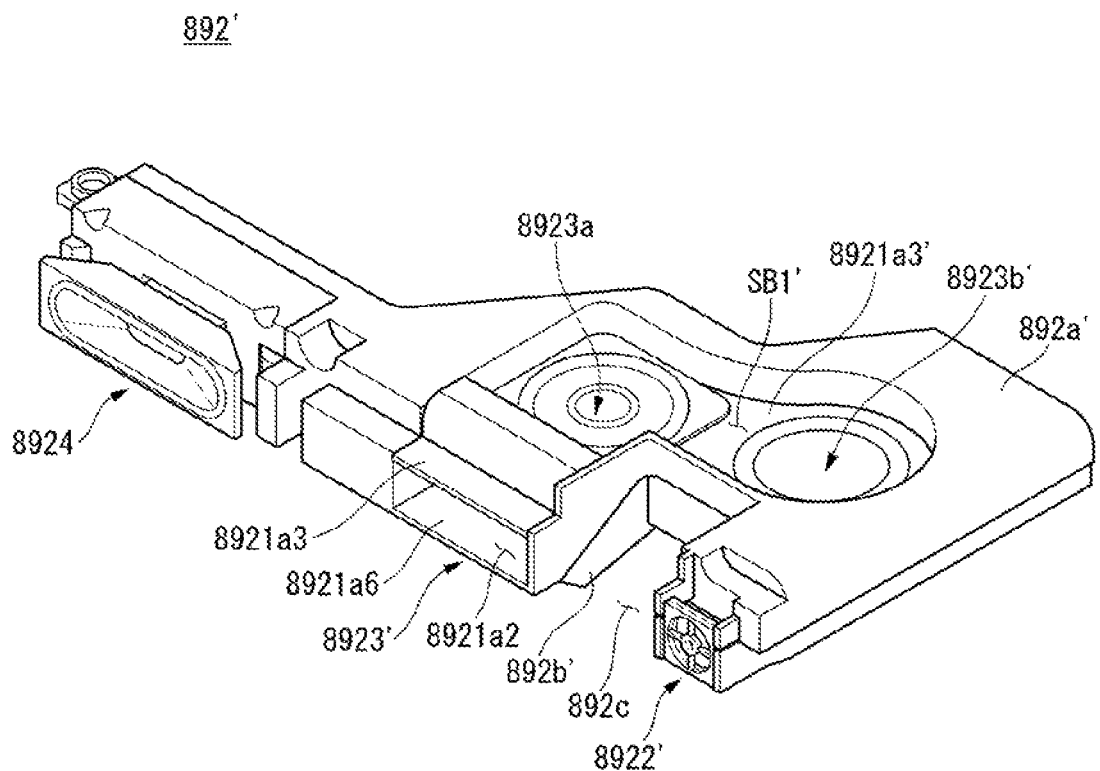

Referring to FIG. 25, a body 892' may include a first sub-body 892a' and a second sub-body 892b'. The first sub-body 892a' and a second sub-body 892b' may be fastened to each other. The body 892' may be referred to as a speaker unit 892'. A second speaker 8923' may be referred to as a speaker unit 8923'. The body 892' may provide a space therein. A plate 8921a3' may divide the space. The space may be divided into an upper space SB1' and a lower space. A speaker 8923a may be installed on the plate 8921a3'. The speaker 8923a may receive electric power. A dust cap, an edge, or a diaphragm of the speaker 8923a may face the upper space SB1'. A speaker 8923b' may be installed on the plate 8921a3'. The speaker 8923b' may not receive electric power. The speaker 8923b' may be referred to as a passive speaker 8923b' or a diaphragm 8923b'. A diaphragm or an edge of the speaker 8923b' may face the upper space SB1'. The second speaker 8923' may include speakers 8923a and 8923b'. The upper space SB1' and the lower space may be dividedly formed by installing the speakers 8923a and 8923b'. The lower space may be an enclosed space. A large number of components for driving the display device may be mounted on the housing 800. The spaces for installing the speakers may not be symmetrical due to the large number of components. A volume of a space for installing the first speaker 8913' may be different from a volume of a space for installing the second speaker 8923'. The space of the second speaker 8923' may be larger than the space of the first speaker 8913'. The speakers 8913a and 8923a may have the same specifications. The speakers 8913b' and 8923b' may have the same specifications.

Figure 26:
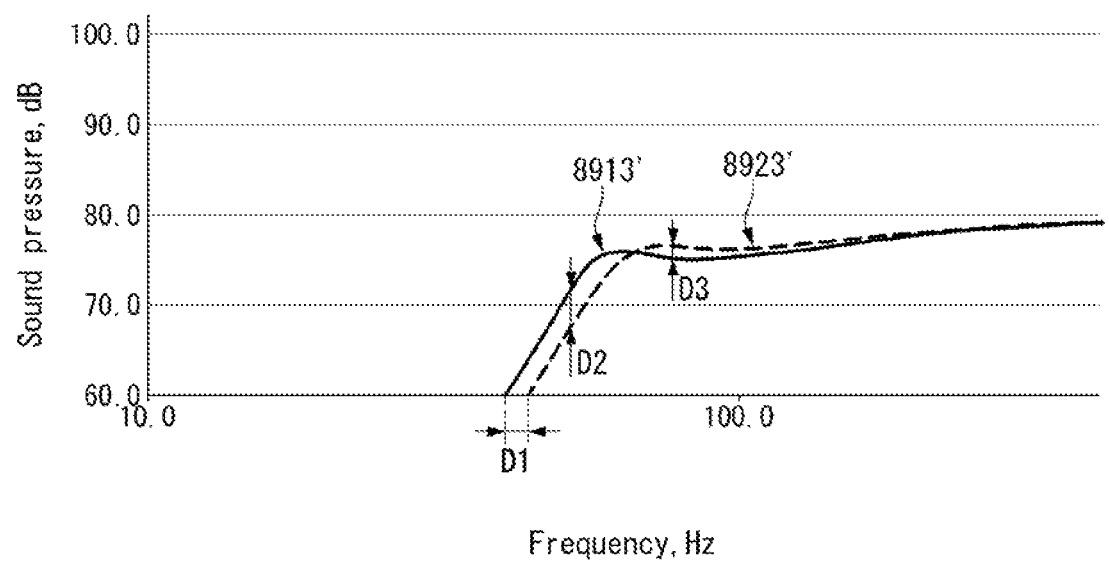

Referring to FIG. 26, a reproduction frequency band of the first speaker 8913' may be wider than a reproduction frequency band of the second speaker 8923'. A bass frequency band of the first speaker 8913' may be wider than a bass frequency band of the second speaker 8923' by D1. At the same frequency, a magnitude of a sound pressure of the first speaker 8913' may be different from a magnitude of a sound pressure of the second speaker 8923'. Below a specific frequency, a sound pressure of the first speaker 8913' may be greater than a sound pressure of the second speaker 8923' by D2. At a specific frequency or more, a sound pressure of the second speaker 8923' may be greater than a sound pressure of the first speaker 8913' by D3. Due to a difference in the reproduction frequency band between the speakers 8913' and 8923', the user may receive some bass from only the first speaker 8913' and may heterogeneously feel the sounds of the speakers 8913' and 8923'.

Figure 27:
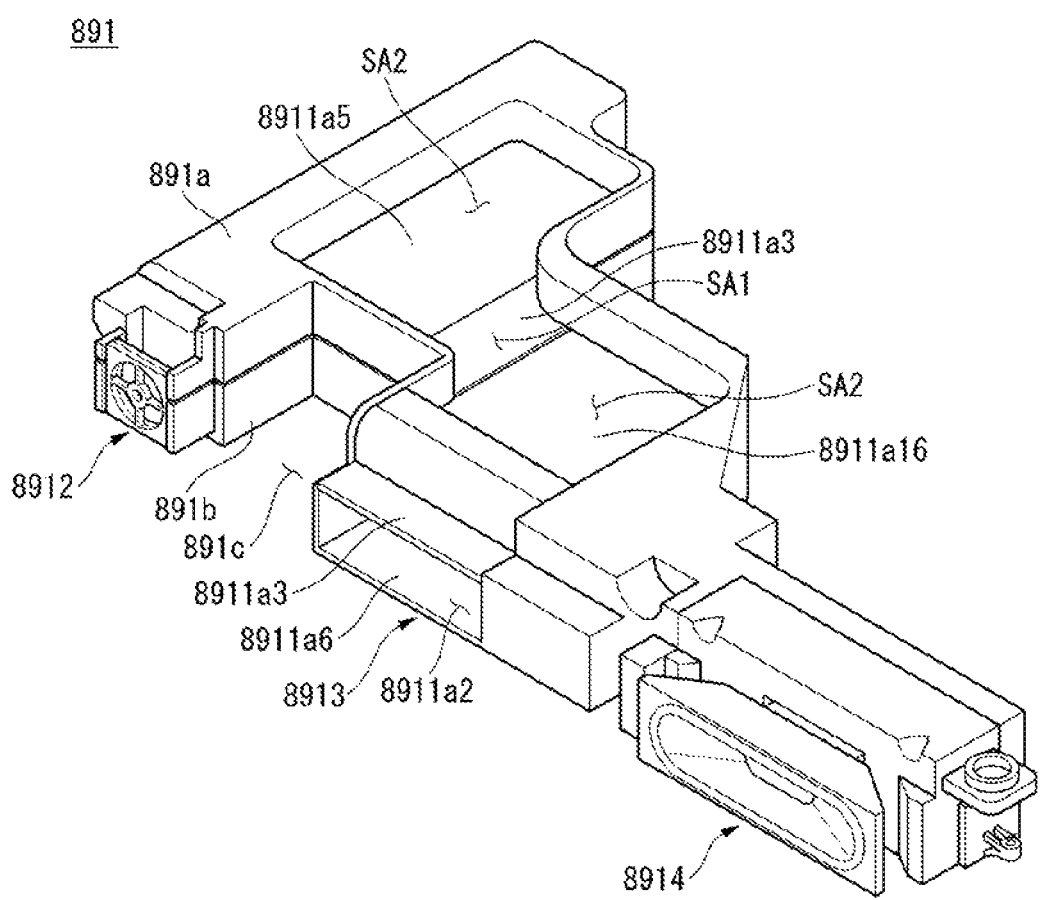

Referring to FIG. 27, a body 891 may include a first sub-body 891a and a second sub-body 891b. The first sub-body 891a and the second sub-body 891b may be fastened to each other. The body 891 may be referred to as a speaker unit 891. A second speaker 8913 may be referred to as a speaker unit 8913. The body 891 may provide spaces SA1 and SA2 therein. A plate 8911a3 may divide the spaces SA1 and SA2. The spaces SA1 and SA2 may be divided into an upper space SA1 and a lower space SA2. The plate 8911a3 may include openings 8911a16 and 8911a5. The openings 8911a16 and 8911a5 may communicate the upper space SA1 and the lower space SA2 with each other. A cover 8911a3 may be fastened to the first sub-body 891a. The first sub-body 891a may include a first part 8911a2. The first part 8911a2 may face the cover 8911a3. The cover 8911a3, the first sub-body 891a, and a first part 8911a6 may form an opening 8911a2. The opening 8911a2 may communicate the upper space SA1 with the outside. A size of the opening 8911a2 may be less than sizes of the openings 8911a16 and 8911a5. The body 891 may include a groove 891c. The groove 891c may be formed between the first speaker 8912 and the second speaker 8913. A depression 8941A may be fastened to the groove 891c.

Figure 28:
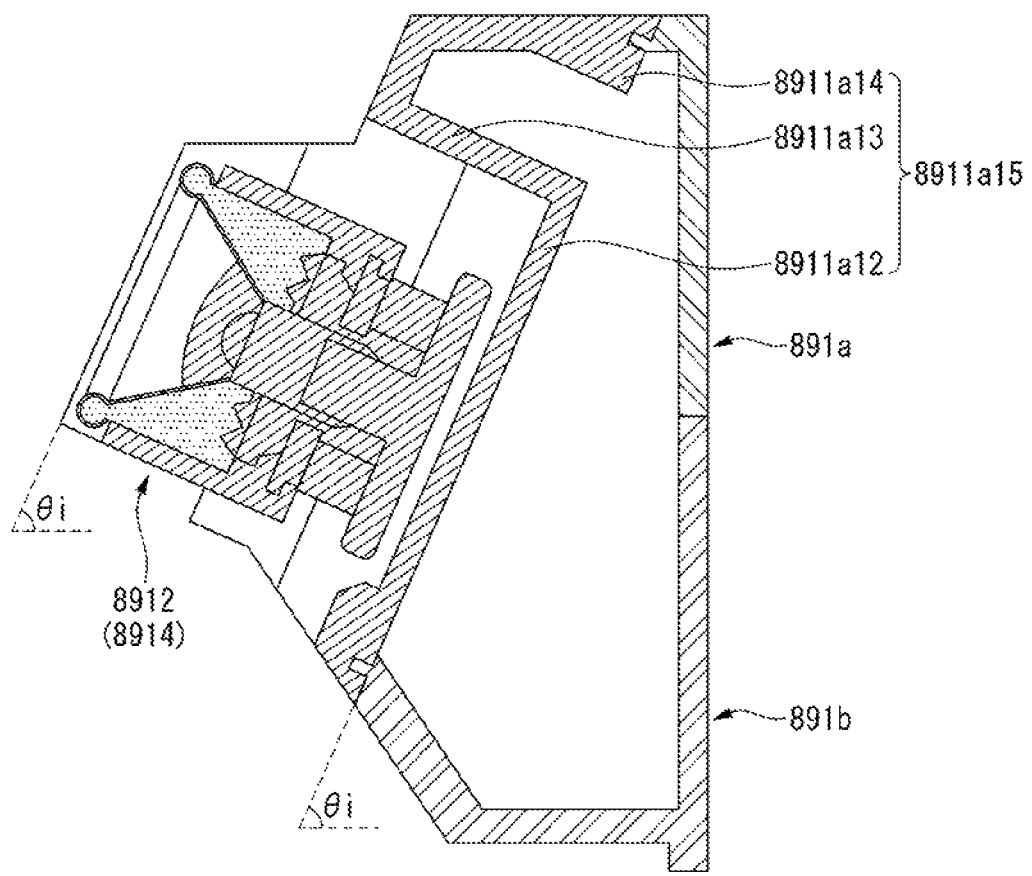

Referring to FIG. 28, the first speaker 8912 or the third speaker 8914 may be inclined to the ground by $\theta i$. The first sub-body 891a may include a second part 8911a12 that is inclined to the ground by $\theta i$. The second part 8911a12 may be coupled to the second sub-body 891b. A third part 8911a13 may be extended vertically to the second part 8911a12. A fourth part 8911a14 may be connected to the third part 8911a13. The fourth part 8911a14 may be parallel to the ground. A mount 8911a15 may include the second to fourth parts 8911a12 to 8911a14. The mount 8911a15 may be referred to as a coupling portion 8911a15.

Figure 29:
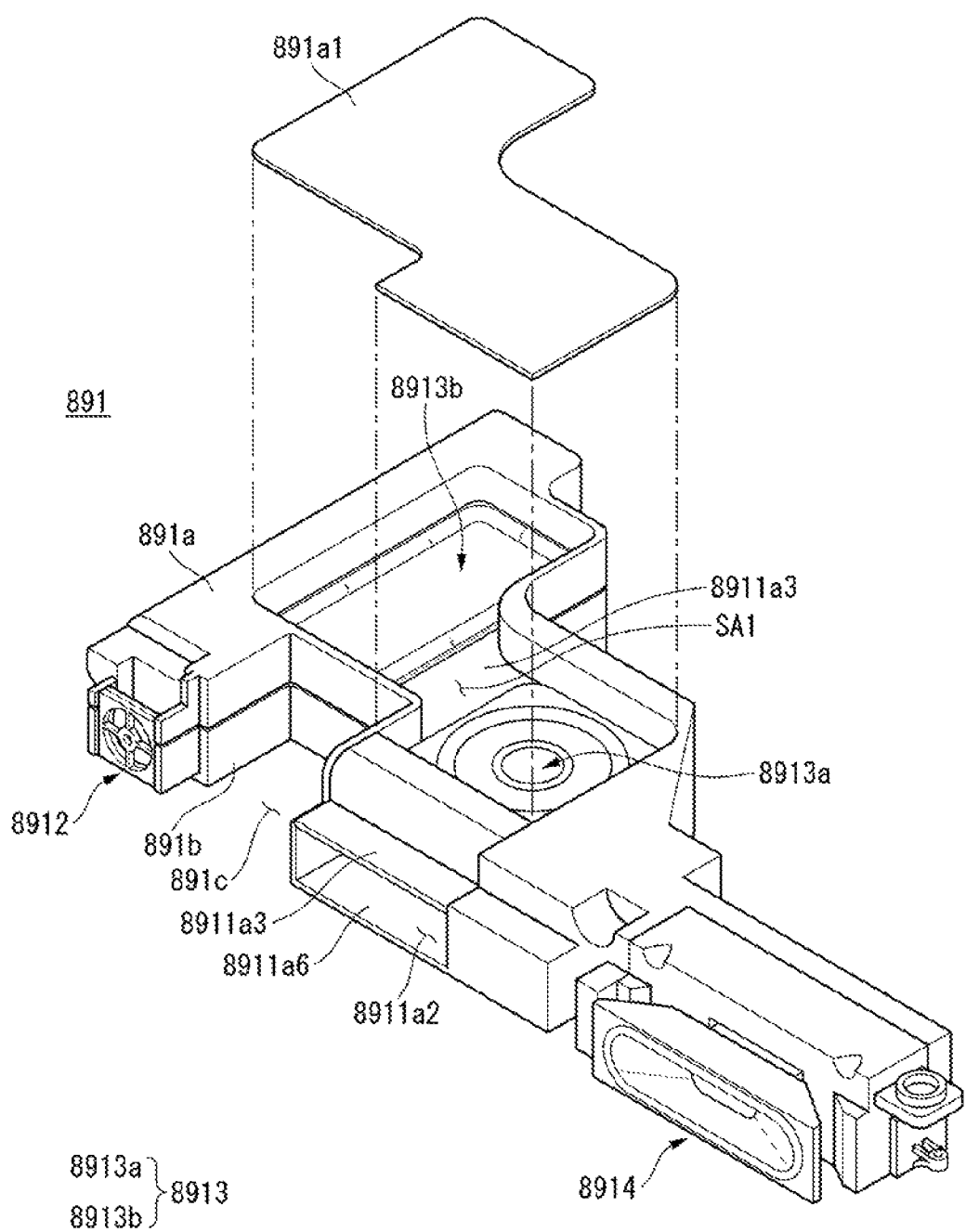

Referring to FIG. 29, the speaker 8913a may be installed in the opening 8911a16. The speaker 8913a may be referred to as a woofer 8913a or an active speaker 8913a. The speaker 8913a may cover the opening 8911a16. The speaker 8913a may receive electric power. A dust cap, an edge, or a diaphragm of the speaker 8913a may face the upper space SA1. A speaker 8913b may be installed in the opening 8911a5. The speaker 8913b may not receive electric power. The speaker 8913b may be referred to as a passive speaker 8913b or a diaphragm 8913b. The speaker 8913b may cover the opening 8911a5. The speaker 8913b may have a quadrilateral shape. A diaphragm or an edge of the speaker 8913b may face the upper space SA1. The second speaker 8913 may include the speakers 8913a and 8913b. The speakers 8913a and 8913b may be installed in the openings 8911a16 and 8911a5, and thus the upper space SA1 and the lower space SA2 may be dividedly formed. The lower space SA2 may be an enclosed space. A cover 891a1 may be coupled to the first sub-body 891a. The cover 891a1 may divide the upper space SA1 and the outside. The cover 891a1 may face the speakers 8913a and 8913b.

Figure 30:
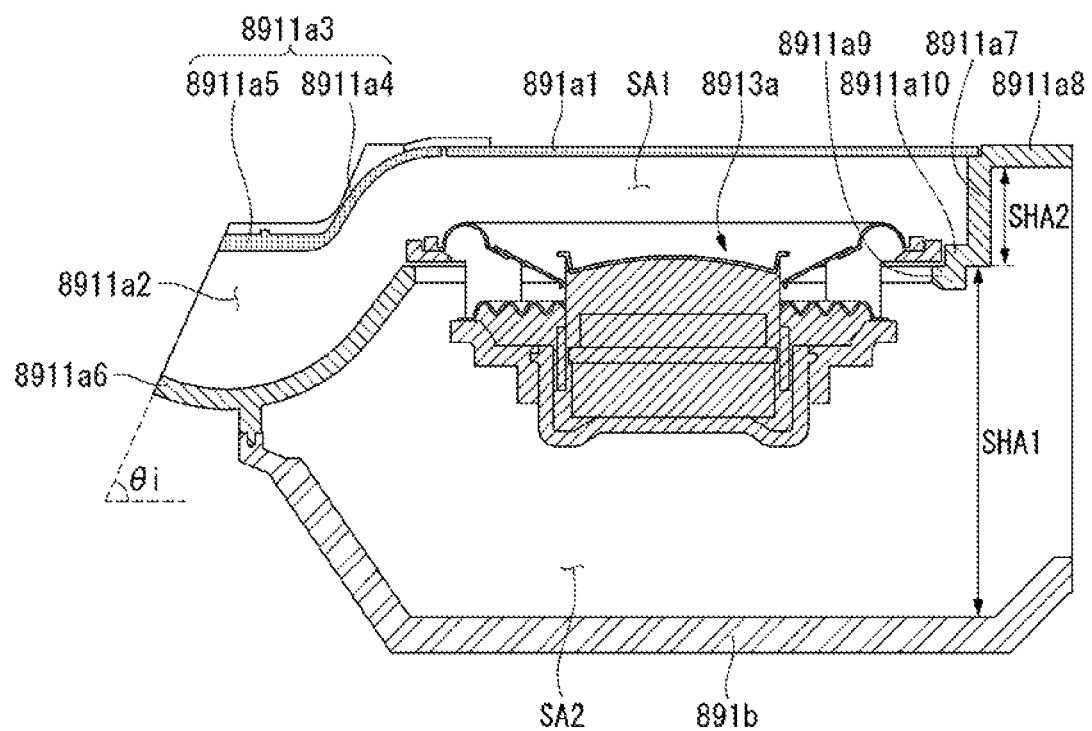

Referring to FIG. 30, the speaker 8913a may be disposed to face upward. The speaker 8913a may face the cover 891a1. An area of the opening 8911a2 may be less than an area of the speaker 8913a. Thus, when the speaker 8913a faces the opening 8911a2, a sound emitted by the speaker 8913a may have difficulty in smoothly passing through the opening 8911a2. For this reason, some sound may not be emitted to the outside of the first speaker unit 891. When the speaker 8913a is disposed to face upward as described above, the sound emitted from the speaker 8913a can pass through the opening 8911a2 through the upper space SA1. The opening 8911a2 may have an angle θi to the ground. The cover 8911a3 may include a first part 8911a5 parallel to the ground and a second part 8911a4 that is extended from the first part 8911a5 and forms a curved surface. A first part 8911a6 may be extended along the cover 8911a3 and form a curved surface. The first part 8911a6 and the cover 8911a3 may form an opening 8911a2. The first part 8911a6 has the curved surface and thus can prevent the sound output from the speaker 8913a from being distorted. The first part 8911a6 can support the speaker 8913a. A fifth part 8911a8 may be parallel to the ground. A sixth part 8911a7 may be extended downward from the fifth part 8911a8. A seventh part 8911a9 may be extended forward from the sixth part 8911a7. An eighth part 8911a10 may be extended from the seventh part 8911a9 and may form a latching jaw. The speaker 8913a may be fastened to the eighth part 8911a10 and the first part 8911a6. The speaker 8913a may be spaced from the second sub-body 891b by a height SHA1. The speaker 8913a may be spaced from the cover 891a1 by a height SHA2. For example, a ratio of the height SHA1 to the height SHA2 may be 1:2 to 1:4. When the speaker 8913a maintains the ratio of the height SHA1 to the height SHA2 to 1:2 to 1:4, the sound emitted from the speaker 8913a can smoothly pass through the opening 8911a2 without a noise.

Figure 31:
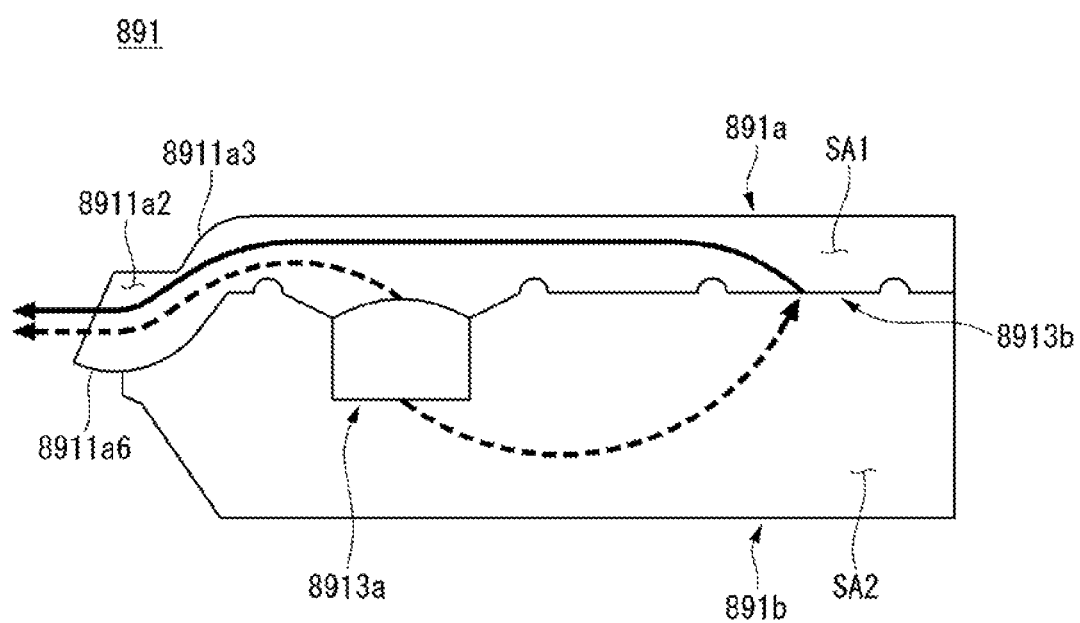
Figure 32:
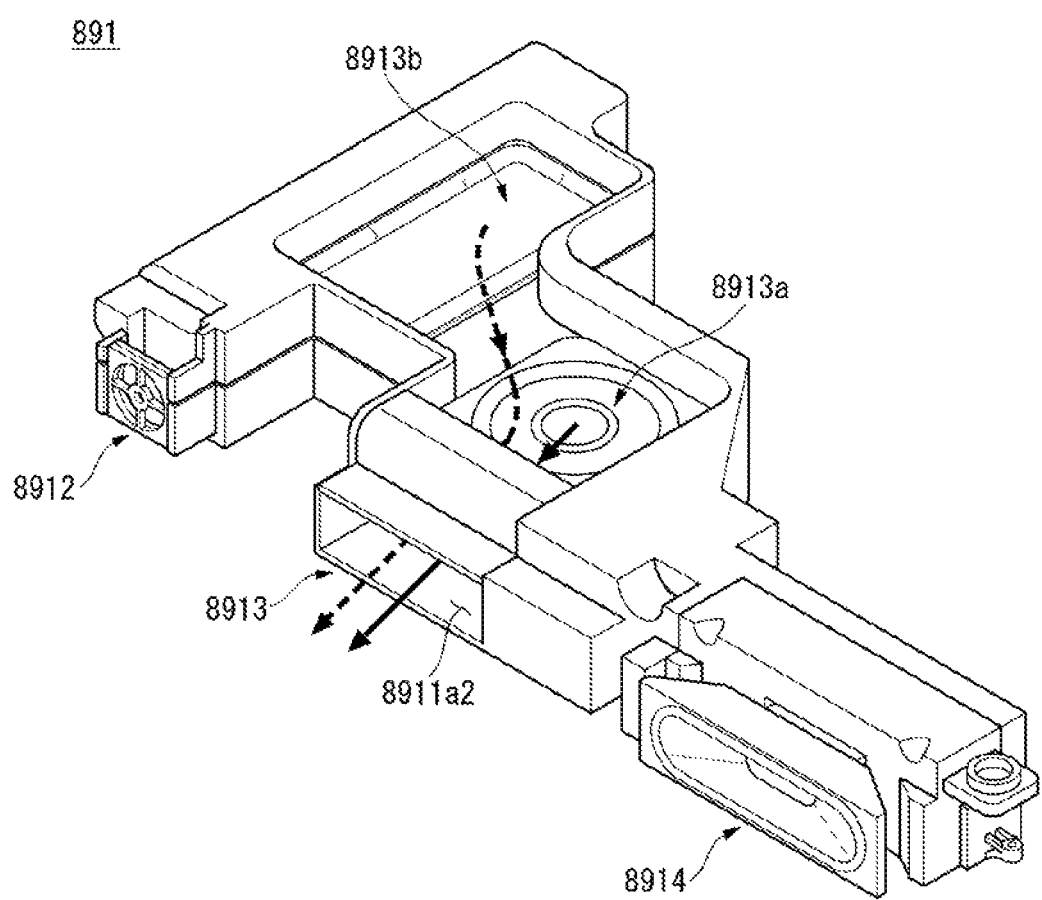

Referring to FIGS. 31 and 32, the speaker 8913a may emit the sound to the upper space SA1 and the lower space SA2. The sound emitted to the upper space SA1 may be emitted to the outside through the opening 8911a2. The sound emitted to the lower space SA2 may vibrate the speaker 8913b. The speaker 8913b may emit the sound to the upper space SA1. The sound emitted to the upper space SA1 may be emitted to the outside through the opening 8911a2. The speaker 8913a may be positioned relatively close to the opening 8911a2, and the speaker 8913b may be positioned relatively far away from the opening 8911a2. The sound emitted from the speaker 8913a may have a relatively short wavelength, and the sound emitted from the speaker 8913b may have a relatively long wavelength. Thus, it may be preferable that the speaker 8913b is positioned relatively farther away from the opening 8911a2 than the speaker 8913a.

Figure 33:
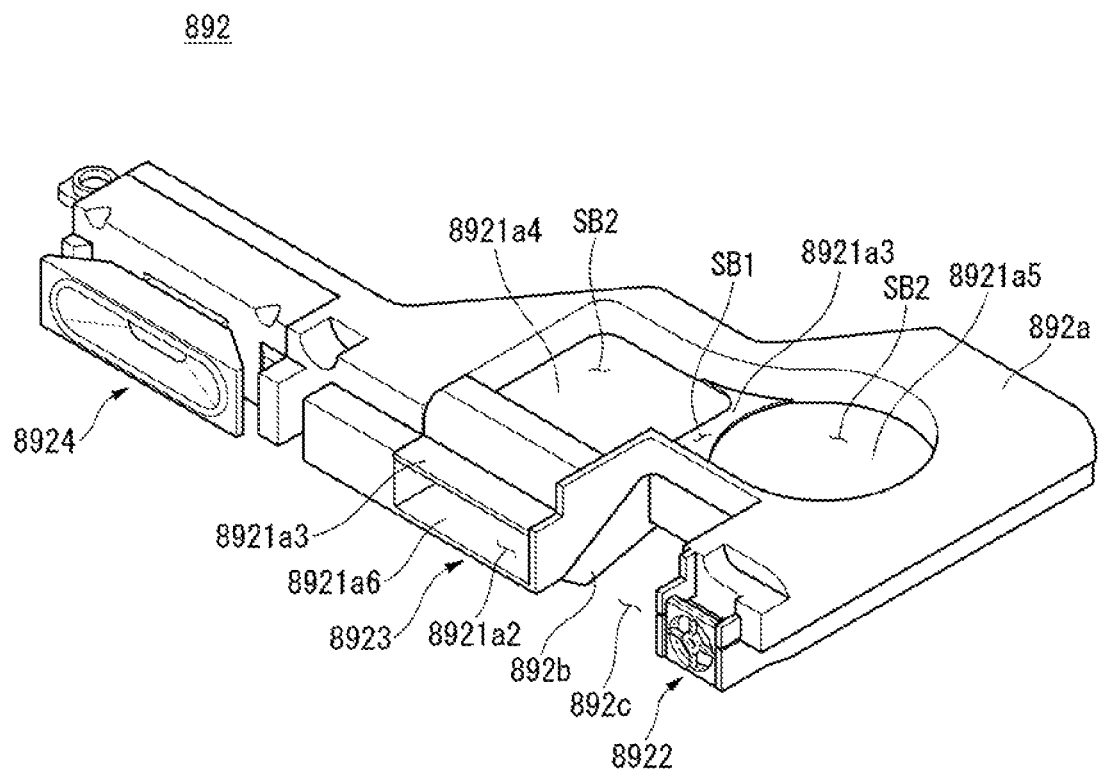

Referring to FIG. 33, a body 892 may include a first sub-body 892a and a second sub-body 892b. The first sub-body 892a and the second sub-body 892b may be fastened to each other. The body 892 may be referred to as a speaker unit 892. A second speaker 8923 may be referred to as a speaker unit 8923. The body 892 may provide spaces SB1 and SB2 therein. A plate 8921a3 may divide the spaces SB1 and SB2. The spaces SB1 and SB2 may be divided into an upper space SB1 and a lower space SB2. The plate 8921a3 may include openings 8921a4 and 8921a5. The openings 8921a4 and 8921a5 may communicate the upper space SB1 and the lower space SB2 with each other. A cover 8921a3 may be fastened to the first sub-body 892a. The first sub-body 892a may include a first part 8921a2. The first part 8921a2 may face the cover 8921a3. The cover 8921a3, the first sub-body 892a, and a first part 8921a6 may form an opening 8921a2. The opening 8921a2 may communicate the upper space SB1 with the outside. A size of the opening 8921a2 may be less than sizes of the openings 8921a4 and 8921a5. The body 892 may include a groove 892c. The groove 892c may be formed between the first speaker 8922 and the second speaker 8923. A depression 8941B may be fastened to the groove 892c.

Figure 34:
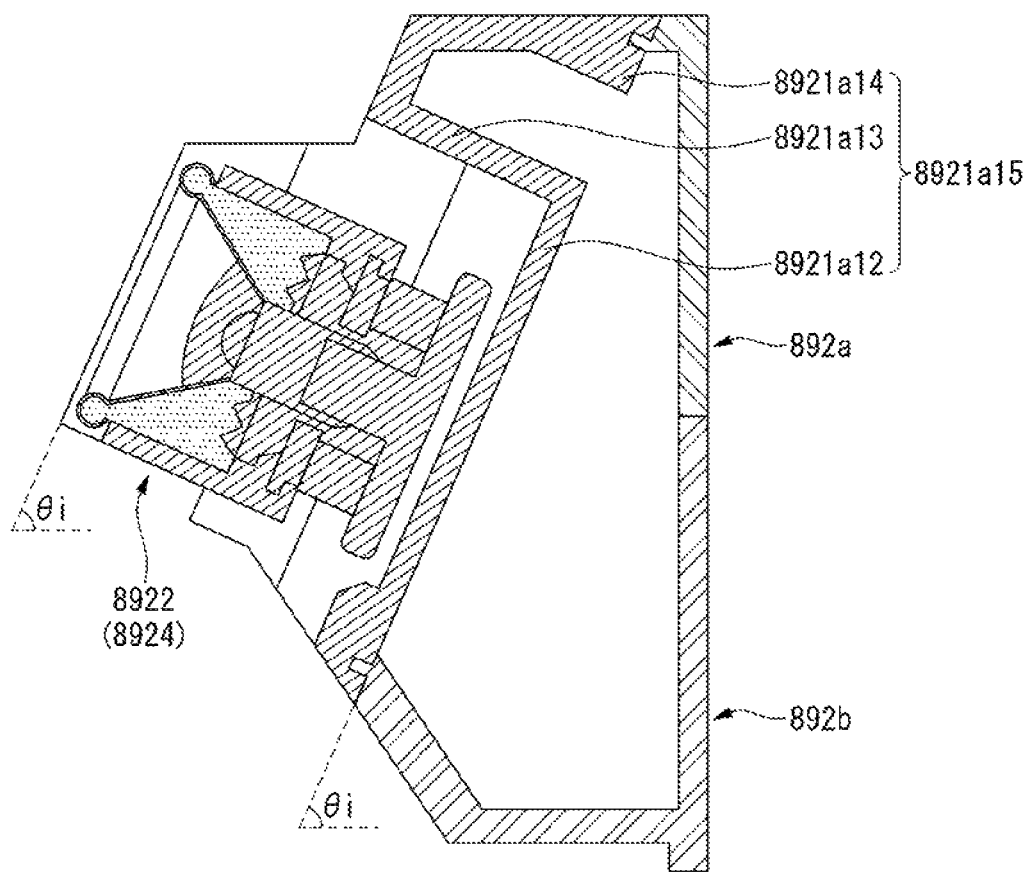

Referring to FIG. 34, the first speaker 8922 or the third speaker 8924 may be inclined to the ground by θi. The first sub-body 892a may include a second part 8921a12 that is inclined to the ground by θi. The second part 8921a12 may be coupled to the second sub-body 892b. A third part 8921a13 may be extended vertically to the second part 8921a12. A fourth part 8921a14 may be connected to the third part 8921a13. The fourth part 8921a14 may be parallel to the ground. A mount 8921a15 may include the second to fourth parts 8921a12 to 8921a14. The mount 8921a15 may be referred to as a coupling portion 8921a15.

Figure 35:
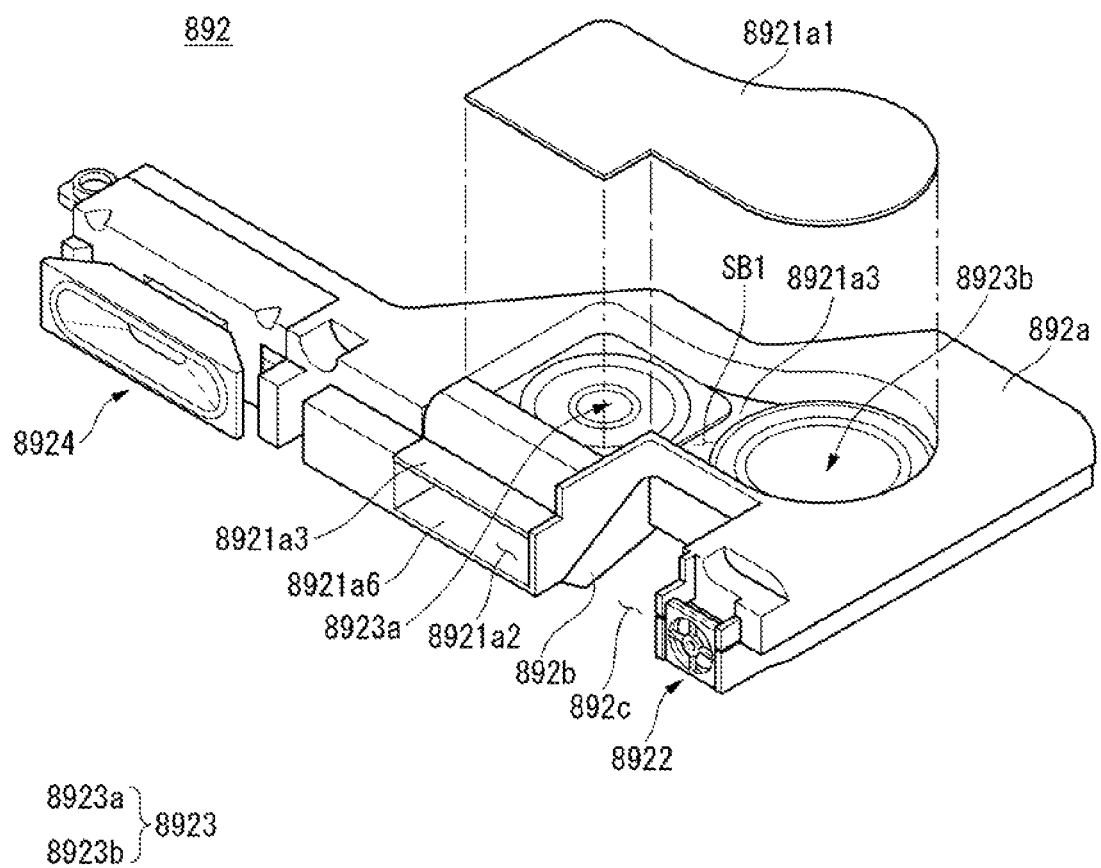

Referring to FIG. 35, the speaker 8923a may be installed in the opening 8921a4. The speaker 8923a may be referred to as a woofer 8923a or an active speaker 8923a. The speaker 8923a may cover the opening 8921a4. The speaker 8923a may receive electric power. A dust cap, an edge, or a diaphragm of the speaker 8923a may face the upper space SB1. The speaker 8923b may be installed in the opening 8921a5. The speaker 8923b may not receive electric power. The speaker 8923b may be referred to as a passive speaker 8923b or a diaphragm 8923b. The speaker 8923b may cover the opening 8921a5. The speaker 8923b may have a circular shape. A diaphragm or an edge of the speaker 8923b may face the upper space SB1. The second speaker 8923 may include the speakers 8923a and 8923b. The speakers 8923a and 8923b may be installed in the openings 8921a4 and 8921a5, and thus the upper space SB1 and the lower space SB2 may be dividedly formed. The lower space SB2 may be an enclosed space. A cover 892a1 may be coupled to the first sub-body 892a. The cover 892a1 may divide the upper space SB1 and the outside. The cover 892a1 may face the speakers 8923a and 8923b.

Figure 36:
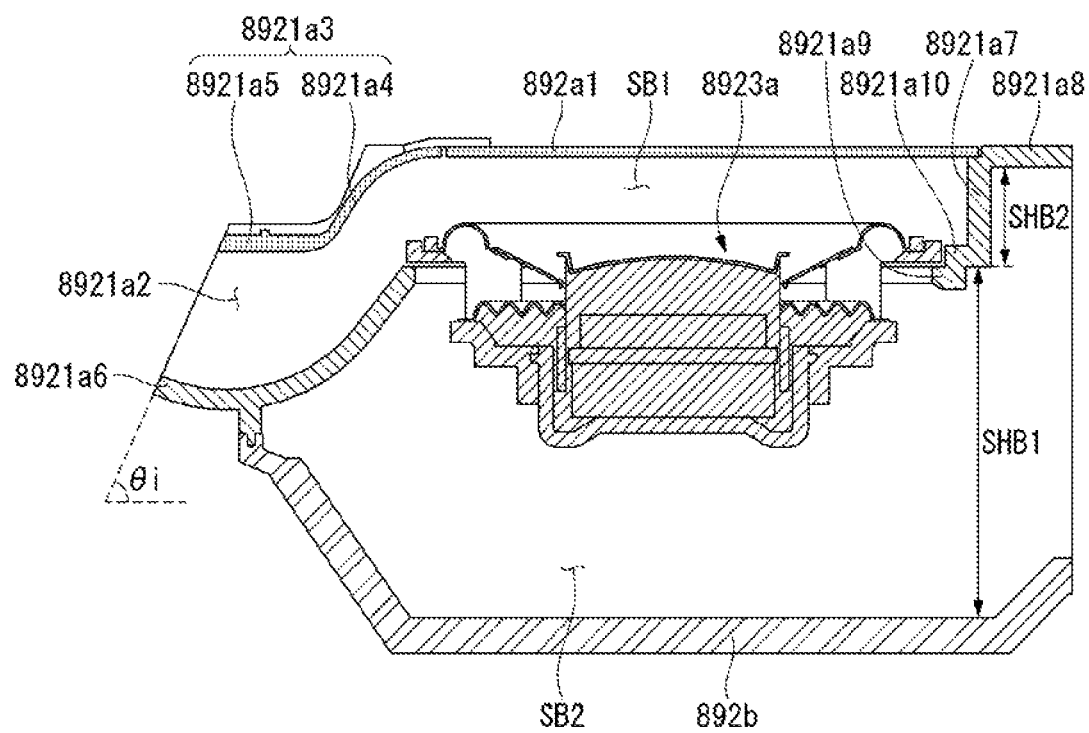

Referring to FIG. 36, the speaker 8923a may be disposed to face upward. The speaker 8923a may face the cover 892a1. An area of the opening 8921a2 may be less than an area of the speaker 8923a. Thus, when the speaker 8923a faces the opening 8921a2, a sound emitted by the speaker 8923a may have difficulty in smoothly passing through the opening 8921a2. For this reason, some sound may not be emitted to the outside of the first speaker unit 892. When the speaker 8923a is disposed to face upward as described above, the sound emitted from the speaker 8923a can pass through the opening 8921a2 through the upper space SB1. The opening 8921a2 may have an angle θi to the ground. The cover 8921a3 may include a first part 8921a5 parallel to the ground and a second part 8921a4 that is extended from the first part 8921a5 and forms a curved surface. A first part 8921a6 may be extended along the cover 8921a3 and form a curved surface. The first part 8921a6 and the cover 8921a3 may form an opening 8921a2. The first part 8921a6 has the curved surface and thus can prevent the sound output from the speaker 8923a from being distorted. The first part 8921a6 can support the speaker 8923a. A fifth part 8921a8 may be parallel to the ground. A sixth part 8921a7 may be extended downward from the fifth part 8921a8. A seventh part 8921a9 may be extended forward from the sixth part 8921a7. An eighth part 8921a10 may be extended from the seventh part 8921a9 and may form a latching jaw. The speaker 8923a may be fastened to the eighth part 8921a10 and the first part 8921a6. The speaker 8923a may be spaced from the second sub-body 892b by a height SHB1. The speaker 8923a may be spaced from the cover 892a1 by a height SHB2. For example, a ratio of the height SHB1 to the height SHB2 may be 1:2 to 1:4. When the speaker 8923a maintains the ratio of the height SHB1 to the height SHB2 to 1:2 to 1:4, the sound emitted from the speaker 8923a can smoothly pass through the opening 8921a2 without a noise.

Figure 37:
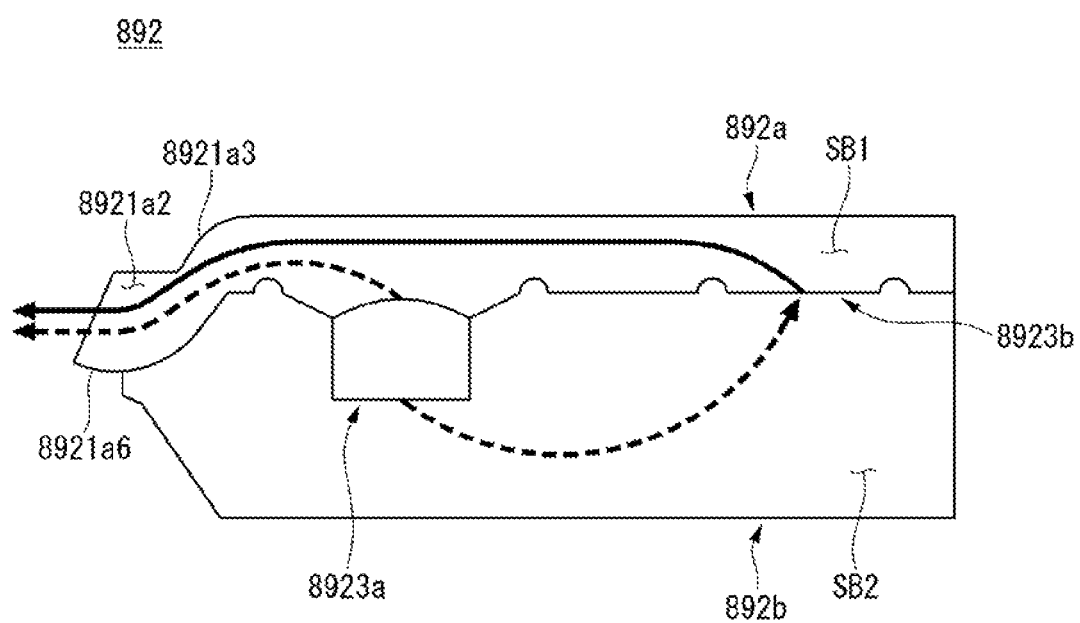
Figure 38:
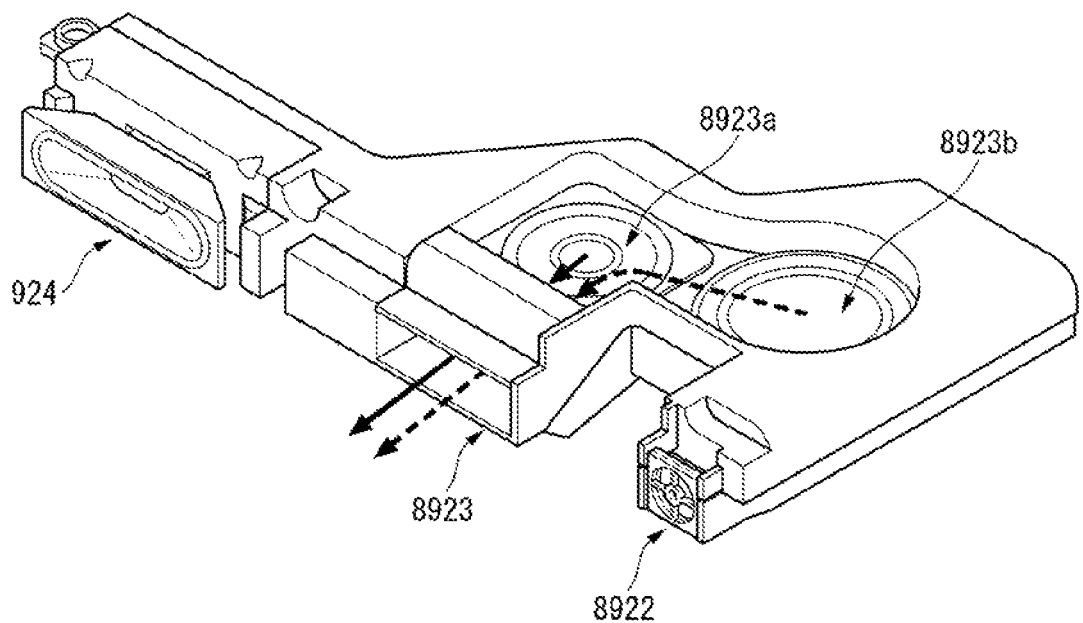

Referring to FIGS. 37 and 38, the speaker 8923a may emit the sound to the upper space SB1 and the lower space SB2. The sound emitted to the upper space SB1 may be emitted to the outside through the opening 8921a2. The sound emitted to the lower space SB2 may vibrate the speaker 8923b. The speaker 8923b may emit the sound to the upper space SB1. The sound emitted to the upper space SB1 may be emitted to the outside through the opening 8921a2. The speaker 8923a may be positioned relatively close to the opening 8921a2, and the speaker 8923b may be positioned relatively far away from the opening 8921a2. The sound emitted from the speaker 8923a may have a relatively short wavelength, and the sound emitted from the speaker 8923b may have a relatively long wavelength. Thus, it may be preferable that the speaker 8923b is positioned relatively farther away from the opening 8921a2 than the speaker 8923a. A large number of components for driving the display device may be mounted on the housing 800. The spaces for installing the speaker units may not be symmetrical due to the large number of components. A volume of a space for installing the first speaker 8913 may be different from a volume of a space for installing the second speaker 8923. The space of the second speaker 8923 may be larger than the space of the first speaker 8913. The speakers 8913a and 8923a may have the same specifications.

Figure 39:
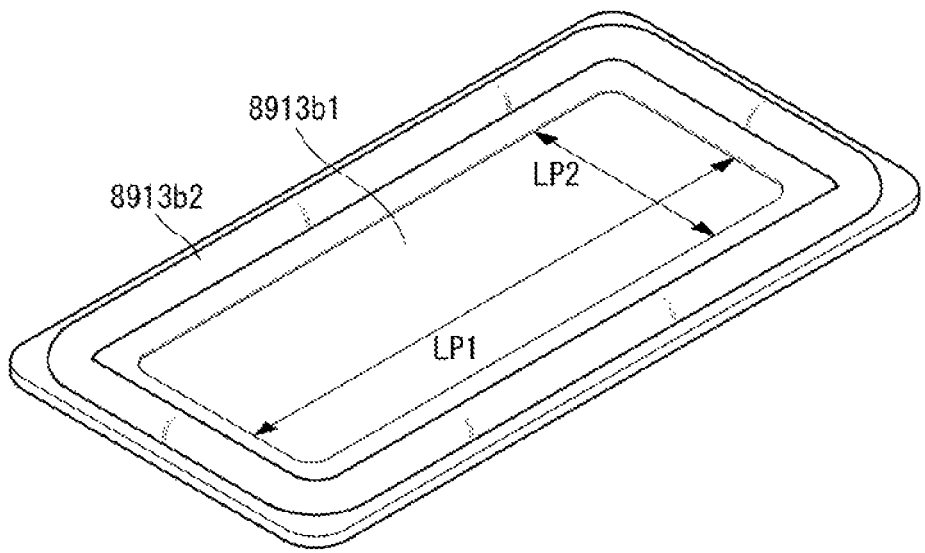

Referring to FIG. 39, the speaker 8913b may include a diaphragm 8913b1 and an edge 8913b2 surrounding the diaphragm 8913b1. The diaphragm 8913b1 may have a rectangular shape. The diaphragm 8913b1 may have a width LP1 and a length LP2. A vibration area of the diaphragm 8913b1 may be an area of the rectangular shape obtained by multiplying the width LP1 and the length LP2.

Figure 40:
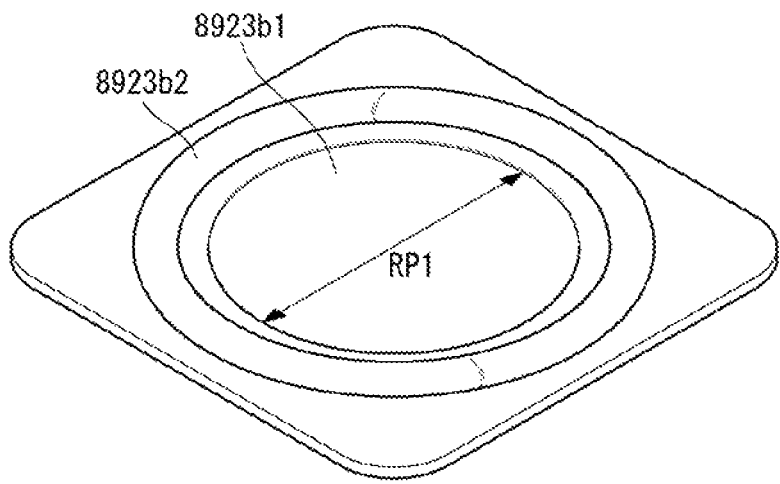

Referring to FIG. 40, the speaker 8923b may include a diaphragm 8923b1 and an edge 8923b2 surrounding the diaphragm 8923b1. The diaphragm 8923b1 may have a circular shape. The diaphragm 8923b1 may have a diameter RP1. A vibration area of the diaphragm 8923b1 may be an area of the circular shape, i.e., an area of a circle having the diameter RP1. The vibration area of the diaphragm 8913b1 may be larger than the vibration area of the diaphragm 8923b1.

Figure 41:
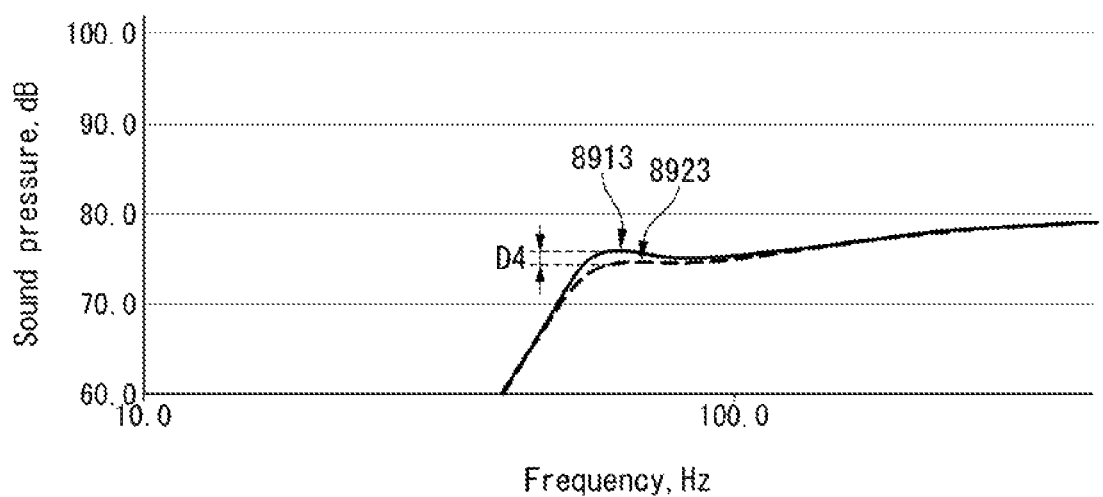

Referring to FIG. 41, the first speaker 8913 having a smaller space than the second speaker 8923 includes the diaphragm 8913b having a vibration area larger than the diaphragm 8923b of the second speaker 8923, and thus the first and second speakers 8913 and 8923 may have substantially the same reproduction frequency band. In some reproduction frequency bands, a magnitude of a sound pressure of the first speaker 8913 may be greater than a magnitude of a sound pressure of the second speaker 8923 by D4. A sound volume that the user mainly hears may be equal to or less than 70 dB. At the sound volume equal to or less than 70 dB, the speakers 8913 and 8923 can deliver substantially the same sound.

Figure 42:
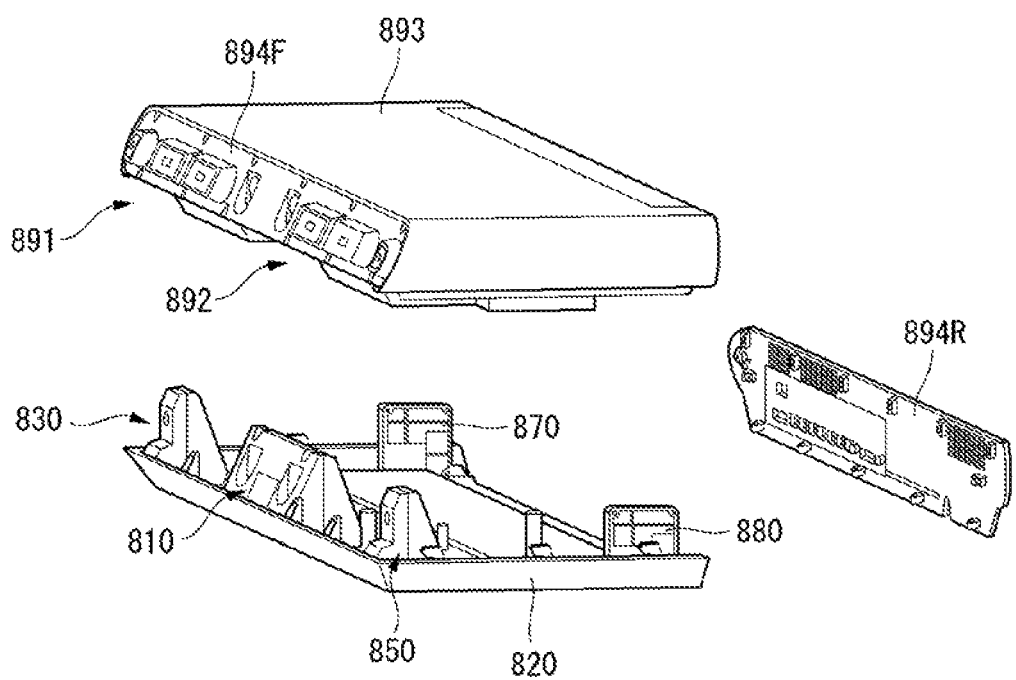

Referring to FIG. 42, the top cover 893 may be coupled to the supporter frame 820. A back cover 894R can block the rear of a space formed by coupling the top cover 893 and the supporter frame 820.

Figure 43:
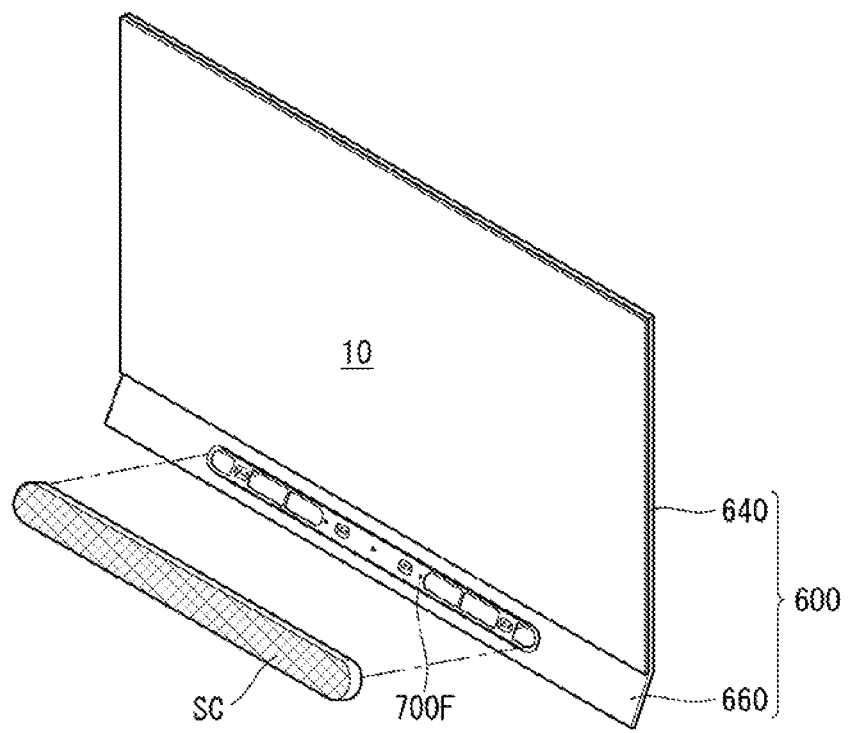

Referring to FIG. 43, a speaker cover SC may be coupled or fixed to the front bracket 700F exposed to the front of the second part 660 of the plate 600. For example, the speaker cover SC may be formed of a metal mesh or a woven mesh.

The foregoing embodiments are merely examples and are not to be considered as limiting the present disclosure. The present teachings can be readily applied to other types of methods and apparatuses. The features, structures, methods, and other characteristics of the embodiments described herein may be combined in various ways to obtain additional and/or alternative embodiments.

Certain embodiments or other embodiments of the disclosure described above are not mutually exclusive or distinct from each other. Any or all elements of the embodiments of the disclosure described above may be combined or combined with each other in configuration or function.

For example, a configuration "A" described in one embodiment of the disclosure and the drawings and a configuration "B" described in another embodiment of the disclosure and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. A display device comprising:
a display panel;
a plate positioned in a rear of the display panel, the plate including a first part to which the display panel is fixed, and a second part extended from a lower end of the first part and bent toward a front of the first part;
a housing positioned in a rear of the second part and coupled to the second part;
a first speaker unit including a first space and a second space isolated from the first space and communicating with an outside, the first speaker unit including a first opening communicating the first space with the second space and a second opening spaced from the first opening and communicating the first space with the second space, the first speaker unit being spaced from the display panel;
a first speaker installed in the first opening and providing a sound to the second space;
a first diaphragm installed in the second opening;
a second speaker unit including a third space and a fourth space isolated from the third space and communicating with the outside, the second speaker unit including a third opening communicating the third space with the fourth space and a fourth opening spaced from the third opening and communicating the third space with the fourth space, the second speaker unit being spaced from the display panel;

a second speaker installed in the third opening and providing a sound to the fourth space; and a second diaphragm installed in the fourth opening and having an area different from an area of the first diaphragm, wherein the first speaker unit and the second speaker unit are installed inside the housing.

2. The display device of claim 1, wherein the first space is larger than the third space.

3. The display device of claim 2, wherein the area of the first diaphragm is larger than the area of the second diaphragm.

4. The display device of claim 1, wherein the first speaker unit includes a fifth opening communicating the second space with the outside, and wherein the first speaker is positioned closer to the fifth opening than the first diaphragm.

5. The display device of claim 4, wherein the second speaker unit includes a sixth opening communicating the fourth space with the outside, and wherein the second speaker is positioned closer to the sixth opening than the second diaphragm.

6. The display device of claim 4, wherein the first opening is larger than the fifth opening.

7. The display device of claim 1, wherein the first speaker unit includes a fifth opening communicating the second space with the outside, wherein the display panel includes a front surface displaying an image, and wherein the fifth opening is positioned forward.

8. The display device of claim 1, wherein the first part is integrally formed with the second part and includes a light transmitting material.

9. The display device of claim 1, wherein the first opening faces upward.

10. The display device of claim 1, wherein the second opening faces upward.

11. The display device of claim 1, wherein the first diaphragm has a quadrilateral shape.

12. The display device of claim 1, further comprising a cover coupled to an upper side of the first speaker unit, wherein the cover is opposite to the first speaker and the first diaphragm.

* * * * *